(12) United States Patent
Tagami et al.

(10) Patent No.: US 7,587,268 B2
(45) Date of Patent: Sep. 8, 2009

(54) CONTROL SYSTEM FOR INTERNAL COMBUSTION ENGINE

(75) Inventors: Hiroshi Tagami, Saitama-ken (JP); Yuji Yasui, Saitama-ken (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 12/009,218

(22) Filed: Jan. 17, 2008

(65) Prior Publication Data

US 2008/0172165 A1     Jul. 17, 2008

(30) Foreign Application Priority Data

Jan. 17, 2007   (JP)   ............... 2007-008191

(51) Int. Cl.
G06G 7/70        (2006.01)
(52) U.S. Cl. .................. 701/102; 701/103; 701/104; 701/105; 701/110; 701/115
(58) Field of Classification Search ............. 123/90.11, 123/406.2, 406.65, 480, 90.17; 251/129.1, 251/54, 64, 65; 180/233, 247, 248, 197; 701/90, 37, 103, 104, 105, 110, 115; 280/5.515; 700/31; 702/182
See application file for complete search history.

(56) References Cited

U.S. PATENT DOCUMENTS

| | | | | |
|---|---|---|---|---|
| 4,794,890 | A * | 1/1989 | Richeson, Jr. ............ | 123/90.11 |
| 5,010,974 | A * | 4/1991 | Matsuda ..................... | 180/233 |
| 5,181,175 | A * | 1/1993 | Shiraishi et al. ............... | 701/90 |
| 5,284,116 | A * | 2/1994 | Richeson, Jr. ............ | 123/406.2 |
| 5,483,448 | A * | 1/1996 | Liubakka et al. ............... | 701/37 |
| 6,898,504 | B2 * | 5/2005 | Kadota ........................ | 701/67 |

| | | | |
|---|---|---|---|
| 2001/0025615 | A1 | 10/2001 | Nohara et al. |

FOREIGN PATENT DOCUMENTS

| | | |
|---|---|---|
| DE | 102005051774 A1 | 6/2006 |
| EP | 1344897 A2 | 9/2003 |
| EP | 1681447 A1 | 7/2006 |

(Continued)

OTHER PUBLICATIONS

Japanese Office Action for Application No. 2007-008191, dated Dec. 9, 2008.

(Continued)

*Primary Examiner*—Stephen K Cronin
*Assistant Examiner*—Keith Coleman
(74) *Attorney, Agent, or Firm*—Lahive & Cockfield, LLP; Anthony A. Laurentano, Esq.

(57) ABSTRACT

A control system for an internal combustion engine, which is capable of ensuring excellent fuel economy of the engine and enhancing the responsiveness of the output of the engine when acceleration is demanded. The control system calculates a lift control input for controlling a variable valve lift mechanism, based on a cam phase of a variable cam phase mechanism, and calculates a demanded acceleration indicative of the degree of acceleration demanded of the engine. Further, the control system calculates a value of phase control input for controlling the variable cam phase mechanism with priority to the engine output, and calculates a value of the same with priority to fuel economy of the engine, and selects between the values of phase control input, based on the demanded acceleration.

6 Claims, 20 Drawing Sheets

FOREIGN PATENT DOCUMENTS

| | | |
|---|---|---|
| EP | 1686253 A2 | 8/2006 |
| JP | 5-79553 | 3/1993 |
| JP | 2005-120990 | 5/2005 |
| JP | 2005-220775 | 8/2005 |
| JP | 2006-90198 | 4/2006 |

OTHER PUBLICATIONS

European Office Action for Application No. 08000230.6—1263, dated May 7, 2008.

* cited by examiner

F I G. 8
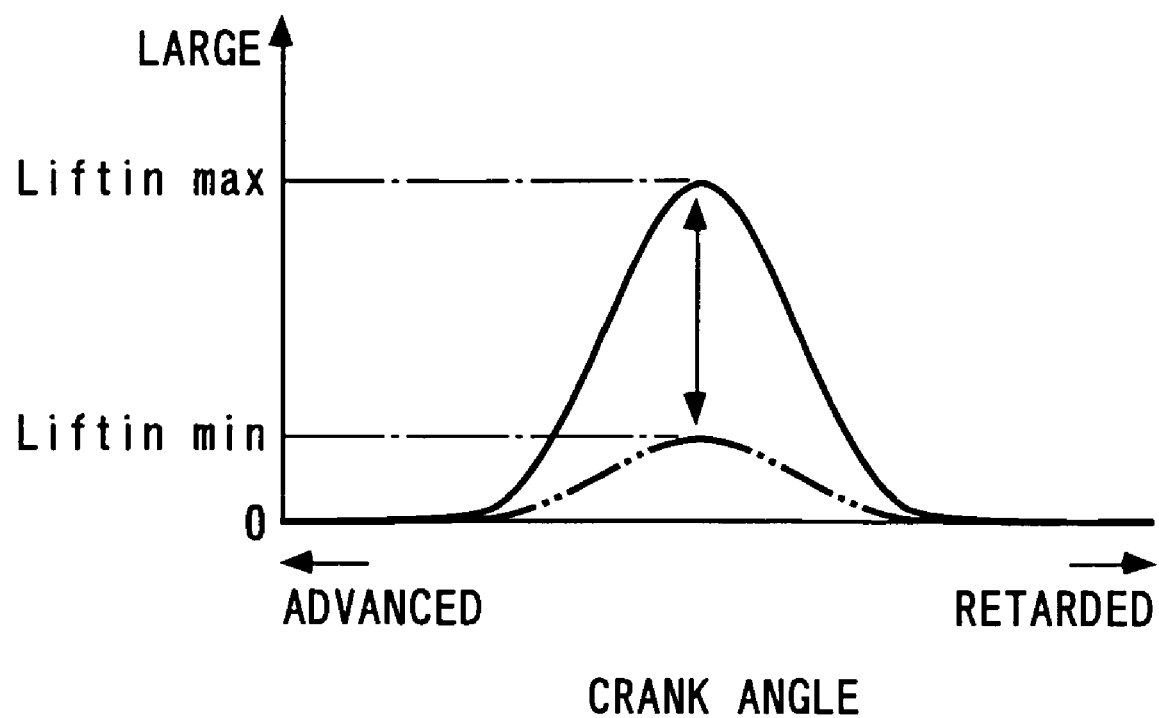

| | LOW ← NE → HIGH | |
|---|---|---|
| SMALL ↑ AP ↓ LARGE | $Bmep\_cmd11$ ········· $Bmep\_cmdi1$ ········· | $Bmep\_cmd1j$ $Bmep\_cmdij$ |

FIG. 16

| | LOW ← NE → HIGH |
|---|---|
| SMALL ↑ Bmep_cmd ↓ LARGE | Cain_M_FC11 ········ Cain_M_FC1j <br> ⋮        ⋮ <br> Cain_M_FCi1 ········ Cain_M_FCij |

FIG. 17

| | LOW ← NE → HIGH |
|---|---|
| SMALL ↑ Bmep_cmd ↓ LARGE | Cain_M_P11 ········ Cain_M_P1j <br> ⋮        ⋮ <br> Cain_M_Pi1 ········ Cain_M_Pij |

| | LOW ← NE → HIGH |
|---|---|
| SMALL ↑ Bmep_cmd ↓ LARGE | Liftin_cmd11 ········· Liftin_cmd1j  <br> ⋮          ⋮          ⋮ <br> Liftin_cmdi1 ········· Liftin_cmdij |

CONTROL SYSTEM FOR INTERNAL COMBUSTION ENGINE

BACKGROUND OF THE INVENTION

1. Field of the Invention

The present invention relates to a control system for an internal combustion engine, which is configured to be capable of changing an intake air amount by changing operating characteristics of an intake valve, using a first variable valve-actuating mechanism and a second variable valve-actuating mechanism having a lower response speed than that of the first variable valve-actuating mechanism.

2. Description of the Related Art

Conventionally, as a control system for an internal combustion engine of this kind, one disclosed in Japanese Laid-Open Patent Publication (Kokai) No. 2006-57573 is known. This combustion engine is provided with a first variable valve-actuating mechanism for changing the valve lift of an intake valve, and a second variable valve-actuating mechanism for changing the central angle of an operating angle of the intake valve (hereinafter simply referred to as "the central angle"). The first and second variable valve-actuating mechanisms use an electric motor and an oil pressure pump as drive sources thereof, respectively, and the response speed of the second variable valve-actuating mechanism, that is, the response speed of the operation amount of the second variable valve-actuating mechanism with respect to a control input therefor is lower than that of the operation amount of the first variable valve-actuating mechanism. In the above-described conventional control system, the intake air amount is controlled by controlling the valve lift and the central angle by the first and second variable valve-actuating mechanisms as follows:

A target central angle, which is a target value of the above-described central angle, is determined by searching a target central angle map according to the load on the engine obtained e.g. by a sensor, and an actual central angle is estimated as an actual central angle equivalent value. In the target central angle map, the target central angle is set to a value which makes it possible to obtain excellent fuel economy of the engine. Further, a target valve lift, which is a target value of the above-described valve lift, is calculated based on the load on the engine and the estimated actual central angle equivalent value. Then, a control input based on the calculated target valve lift is input to the first variable valve-actuating mechanism, and a control input based on the calculated target central angle is input to the second variable valve-actuating mechanism, whereby the valve lift and the central angle are controlled to the target valve lift and the target central angle, respectively. Thus, the response delay of the operation amount of the second variable valve-actuating mechanism with respect to the control input is compensated for, to thereby accurately control the intake air amount.

As described above, in the conventional control system, the target central angle, which is set in the target central angle map to such a value as will make it possible to obtain excellent fuel economy, is used only as the target value of the central angle. As a result, in the conventional control system, when the load on the engine is suddenly increased due to demand of acceleration, the response delay of the second variable valve-actuating mechanism cannot be sufficiently compensated for, which makes it impossible to obtain a sufficient intake air amount. This makes it impossible to increase the output of the engine with high responsiveness to the load on the engine. Further, to eliminate the above inconveniences, it is considered that the target central angle is set in the target central angle map with priority given to the output but not to the fuel economy. In this case, however, it is impossible to obtain excellent fuel economy of the engine.

SUMMARY OF THE INVENTION

It is an object of the present invention to provide a control system for an internal combustion engine, which is capable of ensuring excellent fuel economy of the engine and enhancing the responsiveness of the output of the engine when acceleration is demanded.

To attain the above object, in a first aspect of the present invention, there is provided a control system for an internal combustion engine that is configured to be capable of changing an intake air amount by changing operating characteristics of an intake valve, using a first variable valve-actuating mechanism, and a second variable valve-actuating mechanism having a lower response speed than a response speed of the first variable valve-actuating mechanism, comprising operation amount-detecting means for detecting an amount of operation of the second variable valve-actuating mechanism with respect to the intake valve, first control input-calculating means for calculating a first control input for controlling the first variable valve-actuating mechanism based on the detected amount of operation of the second variable valve-actuating mechanism, load parameter-detecting means for detecting a load parameter indicative of load on the engine, demanded acceleration degree parameter-calculating means for calculating a demanded acceleration degree parameter indicative of a degree of acceleration demanded of the engine, output priority-type calculation means for calculating a second control input for controlling the second variable valve-actuating mechanism, based on the detected load parameter with priority to an output of the engine, fuel economy priority-type calculation means for calculating the second control input based on the load parameter with priority to fuel economy of the engine, and selection means for selecting one of the output priority-type calculation means and the fuel economy priority-type calculation means as calculation means for calculating the second control input, according to the calculated demanded acceleration degree parameter.

With the configuration of the control system according to the first aspect of the present invention, the load parameter-detecting means detects the load parameter indicative of load on the engine, and the demanded acceleration degree parameter-calculating means calculates the demanded acceleration degree parameter indicative of the degree of acceleration demanded of the engine (hereinafter referred to as "the demanded acceleration degree"). Further, as calculation means for calculating the second control input based on the detected load parameter, the control system is provided with the output priority-type calculation means for calculating the second control input with priority to the output of the engine, and the fuel economy priority-type calculation means for calculating the second control input with priority to fuel economy. The selection means selects between the output priority-type calculation means and the fuel economy priority-type calculation means, based on the calculated demanded acceleration degree parameter, and the selected calculating means calculates the second control input.

Therefore, when the demanded acceleration degree parameter is indicating that acceleration is demanded, if the output priority-type calculation means is selected, it is possible to obtain an intake air amount suitable for satisfying the demand of acceleration, thereby making it possible to quickly increase the output of the engine to enhance responsiveness thereof. Further, when the demanded acceleration degree parameter is not indicating the demand of acceleration, if the fuel economy priority-type calculation means is selected, it is possible to obtain excellent fuel economy of the engine when acceleration is not demanded. Thus, it is made possible to ensure excellent fuel economy of the engine to enhance the responsiveness of the output of the engine when acceleration is demanded.

Further, the operation amount-detecting means detects the amount of operation of the second variable valve-actuating mechanism with respect to the intake valve, and the first control input-calculating means calculates the first control input for controlling the first variable valve-actuating mechanism based on the detected amount of operation of the second variable valve-actuating mechanism. As described above, the first control input for controlling the first variable valve-actuating mechanism having a higher response speed is calculated based on the actual amount of operation of the second variable valve-actuating mechanism having a lower response speed, and hence, it is possible to compensate for response delay of the second variable valve-actuating mechanism by intake air amount control using the first variable valve-actuating mechanism. This makes it possible to more excellently obtain the above-described effects, i.e. the effects of ensuring excellent fuel economy and enhancing the responsiveness of the output of the engine when acceleration is demanded. It should be noted that throughout the specification, "detection" includes not only detection by sensors but also "calculation" and "estimation" by computation.

Preferably, the engine is installed on a vehicle as a drive source, and the control system further comprises drive wheel demanded torque-calculating means for calculating a drive wheel demanded torque demanded of drive wheels of the vehicle, and traveling resistance-calculating means for calculating a traveling resistance of the vehicle, wherein the demanded acceleration degree parameter-calculating means calculates the demanded acceleration degree parameter based on the calculated drive wheel demanded torque and the calculated traveling resistance.

With the configuration of this preferred embodiment, the drive wheel demanded torque demanded of the drive wheels of the vehicle, and the traveling resistance of the vehicle are calculated, and the demanded acceleration degree parameter is calculated based on the calculated drive wheel demanded torque and traveling resistance. In general, when the vehicle is traveling at a constant speed, the drive wheel demanded torque and the traveling resistance are equal to and balanced with each other, whereas during acceleration of the vehicle, the drive wheel demanded torque becomes larger than the traveling resistance, and the degree of increase of the drive wheel demanded torque becomes larger as the demanded acceleration degree is larger. As described above, the drive wheel demanded torque and the traveling resistance have close correlations with the demanded acceleration degree, and therefore according to the present invention, it is possible to properly calculate the demanded acceleration degree parameter.

More preferably, the control system further comprises drive wheel torque-detecting means for detecting a torque of the drive wheels, vehicle speed-detecting means for detecting a speed of the vehicle, and acceleration-detecting means for detecting acceleration of the vehicle, and the traveling resistance-calculating means comprises reference traveling resistance-calculating means for calculating a traveling resistance to be obtained when the vehicle and a road surface on which the vehicle travels are in respective predetermined reference states, based on the detected vehicle speed, as a reference traveling resistance, reference acceleration resistance-calculating means for calculating an acceleration resistance to be obtained when the vehicle is in the predetermined reference state, based on the detected acceleration of the vehicle, as a reference acceleration resistance, and correction value-calculating means for calculating a correction value based on the detected torque of the drive wheels, the calculated reference traveling resistance, and the calculated reference acceleration resistance, and wherein the traveling resistance is calculated by correcting the reference traveling resistance using the calculated correction value.

With the configuration of this preferred embodiment, the traveling resistance is calculated as follows: The torque of the drive wheels is detected, and a traveling resistance to be obtained when the vehicle and the road surface on which the vehicle travels are in the respective predetermined reference states is calculated based on the detected vehicle speed, as a reference traveling resistance. Further, an acceleration resistance to be obtained when the vehicle is in the predetermined reference state is calculated based on the detected acceleration of the vehicle, as a reference acceleration resistance. Furthermore, a correction value is calculated based on the torque of the drive wheels, the reference traveling resistance, and the reference acceleration resistance, and the traveling resistance is calculated by correcting the reference traveling resistance using the calculated correction value.

In general, the traveling resistance is the sum of a rolling resistance, an air resistance, and a gradient resistance, and changes depending on the states (e.g. weight and front projection area) of the vehicle, and states (e.g. irregularities and gradient) of a road surface on which the vehicle travels. Therefore, unless the vehicle and a road surface are in the above-described respective reference states, actual traveling resistance is different from the above-mentioned reference traveling resistance. Further, normally, the torque of the drive wheels corresponds to the sum of an actual traveling resistance and an actual acceleration resistance (hereinafter referred to as "the total actual traveling resistance") during acceleration of the vehicle, and corresponds to the actual traveling resistance when the vehicle is traveling at a constant speed except during acceleration of the vehicle. Further, during travel at a constant speed, the reference acceleration resistance becomes equal to 0. From the above, the difference between the torque of the drive wheels and the sum of the reference traveling resistance and the reference acceleration resistance (hereinafter referred to as "the total reference traveling resistance") corresponds to the difference between the total actual traveling resistance and the total reference traveling resistance during acceleration of the vehicle, and corresponds to the difference between the actual traveling resistance and the reference traveling resistance during travel at a constant speed.

Therefore, according to the present invention, the reference traveling resistance is corrected by the correction value calculated based on the torque of the drive wheels, the reference traveling resistance, and the reference acceleration resistance, whereby it is possible to accurately calculate the actual traveling resistance with reference to the reference traveling resistance. Further, as described above, it is possible to calculate the traveling resistance only by computations, without requiring values obtained by detections of the actual weight of the vehicle and the gradients of a road surface. This makes it possible to dispense with sensors for detecting the above values, thereby making it possible to reduce the manufacturing costs of the control system.

To attain the above object, in a second aspect of the present invention, there is provided a control system for an internal combustion engine that is configured to be capable of changing an intake air amount by changing operating characteristics of an intake valve, using a first variable valve-actuating mechanism, and a second variable valve-actuating mechanism having a lower response speed than a response speed of the first variable valve-actuating mechanism, comprising operation amount-detecting means for detecting an amount of operation of the second variable valve-actuating mechanism with respect to the intake valve, first control input-calculating means for calculating a first control input for controlling the first variable valve-actuating mechanism based on the detected amount of operation of the second variable valve-actuating mechanism, load parameter-detecting means for detecting a load parameter indicative of load on the engine, demanded acceleration degree parameter-calculating means for calculating a demanded acceleration degree parameter indicative of a degree of acceleration demanded of the engine, output priority-type calculation means for calculating a second control input for controlling the second variable valve-actuating mechanism, based on the detected load parameter with priority to an output of the engine, fuel economy priority-type calculation means for calculating the second control input based on the load parameter with priority to fuel economy of the engine, and second control input-calculating means for calculating the second control input by calculating a weighted average of a value calculated by the output priority-type calculation means and a value calculated by the fuel economy priority-type calculation means, using a weight dependent on the calculated demanded acceleration degree parameter.

With the configuration of the control system according to the second aspect of the present invention, similarly to the first aspect of the present invention, the load parameter and the demanded acceleration degree parameter are obtained. Further, according to the load parameter, the weighted average of the value calculated by the output priority-type calculation means (hereinafter referred to as "the output priority-type calculated value") and the value calculated by the fuel economy priority-type calculation means (hereinafter referred to as "the fuel economy priority-type calculated value") is calculated using a weight dependent on the demanded acceleration degree parameter, whereby the second control input is calculated.

As described above, the second control input is calculated by calculating the weighted average of the output priority-type calculated value and the fuel economy priority-type calculated value using the weight dependent on the demanded acceleration degree parameter, so that it is possible to calculate the second control input according to the demanded acceleration degree in a fine-grained manner. Therefore, for example, when the demanded acceleration degree parameter is indicating that acceleration is demanded, by increasing the weight of the output priority-type calculated value with respect to the second control input, it is possible to enhance the responsiveness of the output of the engine when acceleration is demanded, similarly to the first aspect of the present invention. Further, when the demanded acceleration degree parameter is not indicating that acceleration is demanded, by increasing the weight of the fuel economy priority-type calculated value, it is possible to obtain excellent fuel economy of the engine when acceleration is not demanded, similarly to the first aspect of the present invention. Thus, similarly to the first aspect of the present invention, it is possible to ensure excellent fuel economy of the engine and at the same time enhance the responsiveness of the output of the engine when acceleration is demanded.

Further, by increasing or decreasing the weight of the output priority-type calculated value according to the magnitude of the demanded acceleration degree indicated by the demanded acceleration degree parameter, differently from the first aspect of the present invention, it is possible to obtain an appropriate second control input that matches the magnitude of the demanded acceleration degree. This makes it possible to ensure excellent fuel economy and enhance the responsiveness of the output of the engine when acceleration is demanded, in a well balanced manner. Further, similarly to the first aspect of the present invention, the amount of operation of the second variable valve-actuating mechanism with respect to the intake valve is detected, and the first control input for controlling the first variable valve-actuating mechanism is calculated based on the detected amount of operation of the second variable valve-actuating mechanism. This makes it possible to compensate for the response delay of the second variable valve-actuating mechanism by the intake air amount control using the first variable valve-actuating mechanism, thereby making it possible to more excellently obtain the above-described effects.

Preferably, the engine is installed on a vehicle as a drive source, and the control system further comprises drive wheel demanded torque-calculating means for calculating a drive wheel demanded torque demanded of drive wheels of the vehicle, and traveling resistance-calculating means for calculating a traveling resistance of the vehicle, wherein the demanded acceleration degree parameter-calculating means calculates the demanded acceleration degree parameter based on the calculated drive wheel demanded torque and the calculated traveling resistance.

More preferably, the control system further comprises drive wheel torque-detecting means for detecting a torque of the drive wheels, vehicle speed-detecting means for detecting a speed of the vehicle, and acceleration-detecting means for detecting acceleration of the vehicle, and the traveling resistance-calculating means comprises reference traveling resistance-calculating means for calculating a traveling resistance to be obtained when the vehicle and a road surface on which the vehicle travels are in respective predetermined reference states, based on the detected vehicle speed, as a reference traveling resistance, reference acceleration resistance-calculating means for calculating an acceleration resistance to be obtained when the vehicle is in the predetermined reference state, based on the detected acceleration of the vehicle, as a reference acceleration resistance, and correction value-calculating means for calculating a correction value based on the detected torque of the drive wheels, the calculated reference traveling resistance, and the calculated reference acceleration resistance, wherein the traveling resistance is calculated by correcting the reference traveling resistance using the calculated correction value.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIG. 8 is a diagram showing a valve lift curve (solid line) of the intake valve obtained when the lower link of the variable valve lift mechanism is in the maximum lift position, and a valve lift curve (two-dot chain line) of the intake valve obtained when the lower link of the variable valve lift mechanism is in the minimum lift position;

FIG. 16 is a diagram showing an example of a fuel economy map;

FIG. 17 is a diagram showing an example of an output map;

DETAILED DESCRIPTION OF PREFERRED EMBODIMENTS

Figure 1:
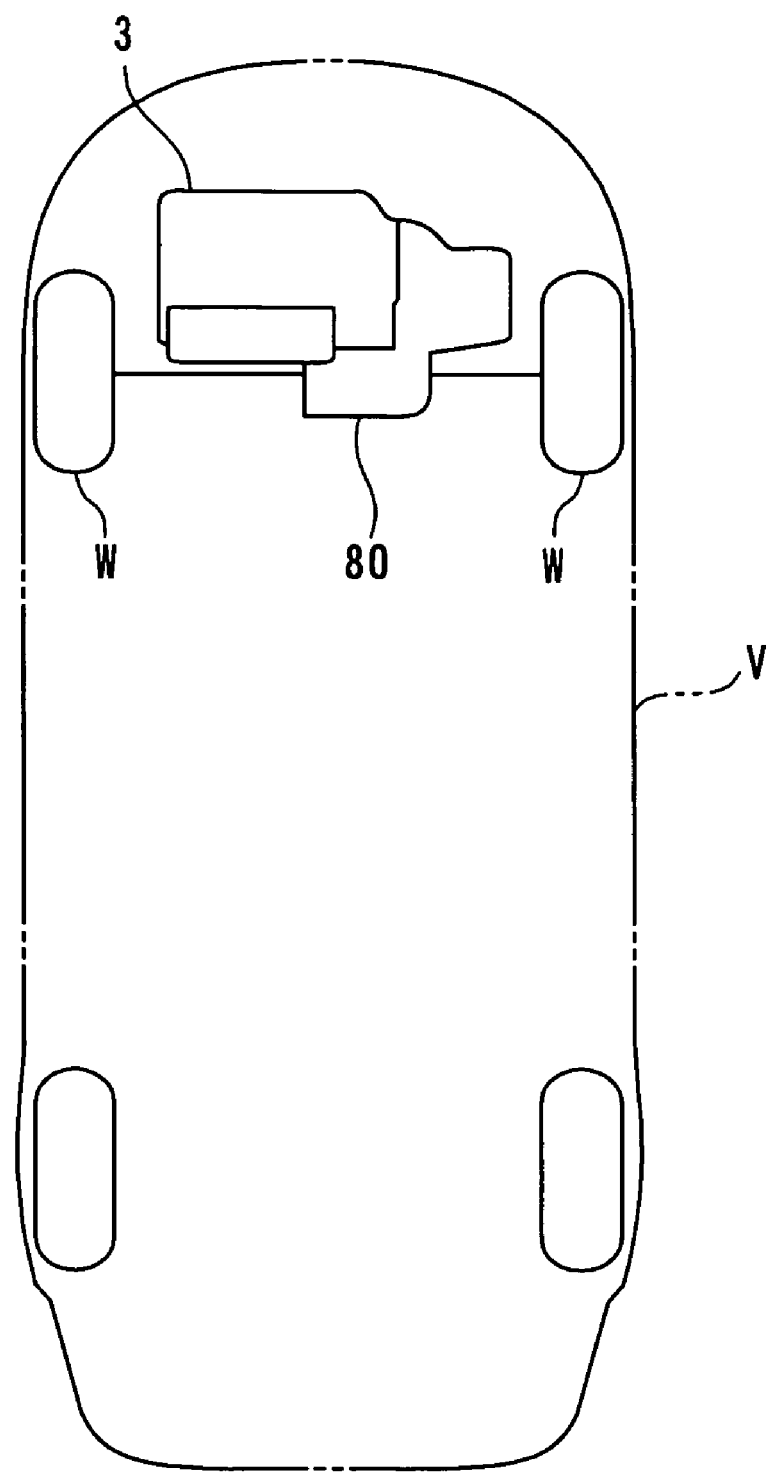
FIG. 1 is a schematic view showing an internal combustion engine to which is applied a control system according to the present embodiment, together with a vehicle having the engine mounted thereon.

The invention will now be described in detail with reference to the drawings showing preferred embodiments thereof. FIG. 1 schematically shows an internal combustion engine (hereinafter simply referred to as "the engine") 3 to which is applied a control system 1 according to the present embodiment, and a vehicle V having the engine 3 mounted thereon as a drive source. The vehicle V has a transmission 80 installed thereon. The transmission 80 is of a manual type for transmitting power from the engine 3 to drive wheels W and W while changing the rotational speed at one of a plurality of predetermined transmission ratios. Further, the transmission 80 is configured such that it selectively sets six gear positions formed by first to fifth speed gear positions and a reverse gear position, and the operation of the transmission 80 is controlled by an ECU 2, described hereinafter, of the control system 1 according to the shift position of a shift lever (not shown) operated by a driver (see FIG. 3).

Figure 2:
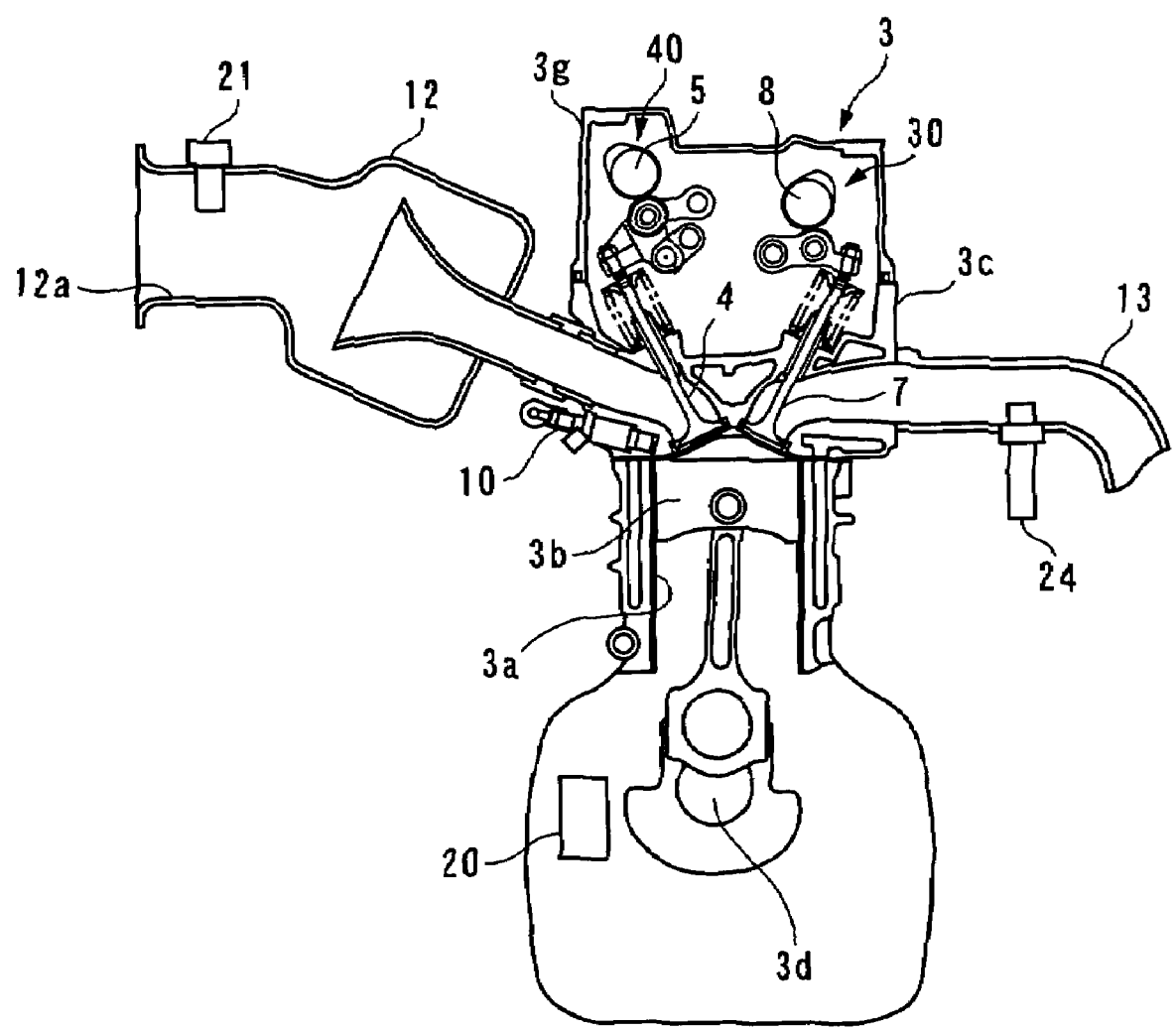
FIG. 2 is a schematic view of the engine appearing in FIG. 1.
Figure 3:
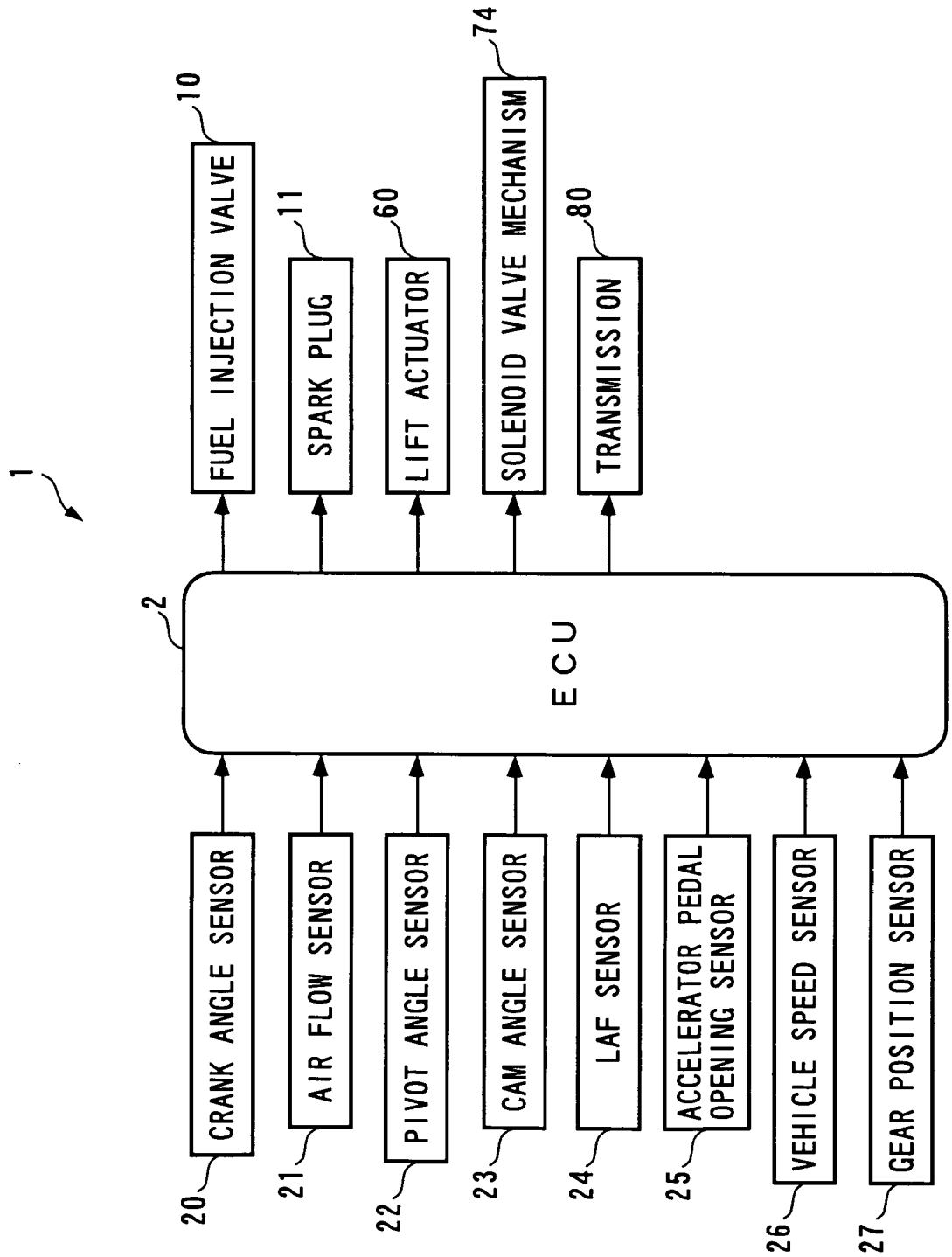
FIG. 3 is a schematic block diagram of the control system.
Figure 4:
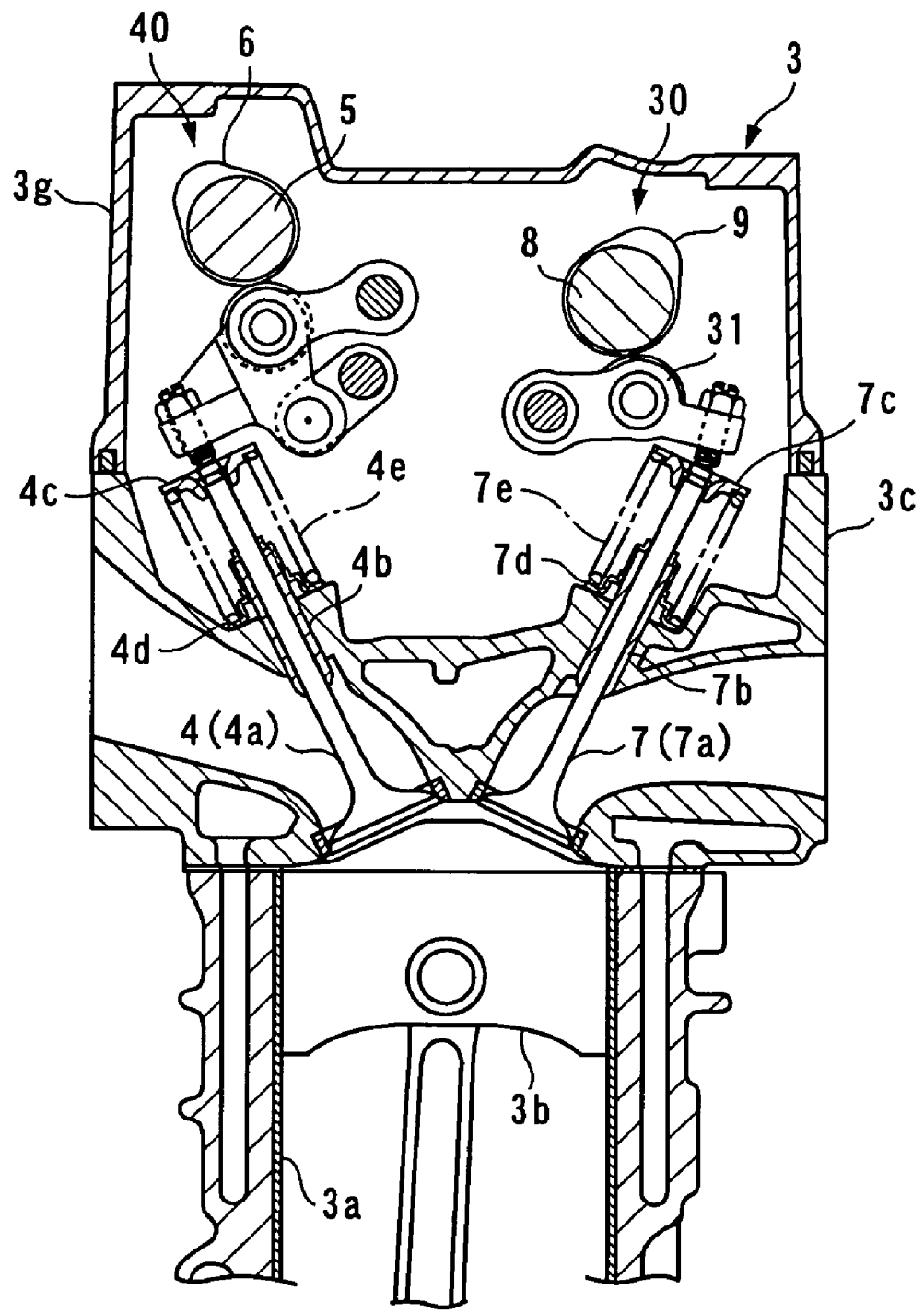
FIG. 4 is a schematic cross-sectional view of a variable intake valve-actuating mechanism and an exhaust valve-actuating mechanism of the engine.

As shown in FIGS. 2 and 4, the engine 3 is an in-line four-cylinder DOHC gasoline engine having four cylinders 3a and pistons 3b (only one of which is shown). Further, the engine 3 includes an intake valve 4 and an exhaust valve 7 for opening and closing an intake port and an exhaust port of each cylinder 3a, respectively, a variable intake valve-actuating mechanism 40 having an intake camshaft 5 and intake cams 6 for actuating the intake valves 4, and an exhaust valve-actuating mechanism 30 having an exhaust camshaft 8 and exhaust cams 9 for actuating the exhaust valves 7, fuel injection valves 10, and spark plugs 11 (see FIG. 3).

The intake valve 4 has a stem 4a thereof slidably fitted in a guide 4b. The guide 4b is rigidly fixed to a cylinder head 3c. The intake valve 4 includes upper and lower spring sheets 4c and 4d, and a valve spring 4e disposed therebetween (see FIG. 5), and is urged by the valve spring 4e in the valve-closing direction.

The intake camshaft 5 and the exhaust camshaft 8 are rotatably mounted through the cylinder head 3c via respective holders, not shown. Further, an intake sprocket, not shown, is coaxially mounted on one end of the intake camshaft 5 in a rotatable manner. The intake sprocket is connected to a crankshaft 3d by a timing belt, not shown, and to the intake camshaft 5 via a variable cam phase mechanism 70, described hereinafter. With the above configuration, the intake camshaft 5 performs one rotation per two rotations of the crankshaft 3d. The intake cam 6 is integrally formed on the intake camshaft 5 for each cylinder 3a.

The variable intake valve-actuating mechanism 40 is provided for actuating the intake valve 4 of each cylinder 3a so as to open and close the same, in accordance with rotation of the intake cam 6, and continuously changing the lift and valve timing of the intake valve 4, which will be described in detail hereinafter. It should be noted that in the present embodiment, the lift of the intake valve 4 (hereinafter referred to as "the valve lift") Liftin represents the maximum stroke of the intake valve 4.

The exhaust valve 7 has a stem 7a thereof slidably fitted in a guide 7b. The guide 7b is rigidly fixed to the cylinder head 3c. Further, the exhaust valve 7 is provided with upper and lower spring sheets 7c and 7d, and a valve spring 7e disposed therebetween, and is urged by the valve spring 7e in the valve-closing direction.

The exhaust camshaft 8 has an exhaust sprocket, not shown, integrally formed therewith, and is connected to the crankshaft 3d by the exhaust sprocket and the timing belt, not shown, whereby the exhaust camshaft 8 performs one rotation per two rotations of the crankshaft 3d. The exhaust cam 9 is integrally formed on the exhaust camshaft 8 for each cylinder 3a.

The exhaust valve-actuating mechanism 30 includes rocker arms 31. Each rocker arm 31 is pivotally moved in accordance with rotation of the associated exhaust cam 9 to thereby actuate the exhaust valve 7 for opening and closing the same against the urging force of the valve spring 7e.

The fuel injection valve 10 is provided for each cylinder 3a, and is mounted through the cylinder head 3c in a tilted state such that fuel is directly injected into a combustion chamber. That is, the engine 3 is configured as a direct injection engine. Further, the valve-opening time period and the valve-opening timing of the fuel injection valve 10 are controlled by the ECU 2.

The spark plugs 11 as well are provided in association with the respective cylinders 3a, and are mounted through the cylinder head 3c. The ignition timing of each spark plug 11 is also controlled by the ECU 2.

The engine 3 is provided with a crank angle sensor 20. The crank angle sensor 20 is comprised of a magnet rotor and an MRE (magnetic resistance element) pickup, and delivers a CRK signal and a TDC signal, which are both pulse signals, to the ECU 2 in accordance with rotation of the crankshaft 3d.

The CRK signal is delivered whenever the crankshaft 3d rotates through a predetermined angle (e.g. 10°). The ECU 2 calculates the rotational speed NE of the engine 3 (hereinafter referred to as "the engine speed NE") based on the CRK signal. The TDC signal indicates that each piston 3b in the associated cylinder 3a is in a predetermined crank angle position slightly before the TDC position at the start of the intake stroke, and in the illustrated example of the four-cylinder type engine, the TDC signal is delivered whenever the crankshaft 3d rotates through a predetermined crank angle of 180°.

Further, the engine 3 has an intake pipe 12 provided with no throttle valve mechanism. An intake passage 12a through the intake pipe 12 is formed to have a large diameter, whereby the engine 3 is configured such that air flow resistance is smaller than an ordinary engine. Further, the intake pipe 12 is provided with an air flow sensor 21. The air flow sensor 21 is formed by a hot-wire air flow meter, and detects an amount QA of intake air drawn into the engine to deliver a signal indicative of the sensed intake air amount QA to the ECU 2.

Next, the aforementioned variable intake valve-actuating mechanism 40 will be described with reference to FIGS. 5 to 8. The variable intake valve-actuating mechanism 40 is comprised of the intake camshaft 5, the intake cams 6, a variable valve lift mechanism 50 (first variable valve-actuating mechanism), and the variable cam phase mechanism 70 (second variable valve-actuating mechanism).

The variable valve lift mechanism 50 is provided for actuating the intake valves 4 to open and close the same, in accordance with rotation of the intake cams 6, and continuously changing the valve lift Liftin between a predetermined maximum value Liftin_H and a predetermined minimum value Liftin_L. The variable valve lift mechanism 50 is comprised of rocker arm mechanisms 51 of a four joint link type, provided for the respective cylinders 3a, and a lift actuator 60 simultaneously actuating these rocker arm mechanisms 51.

Each rocker arm mechanism 51 is comprised of a rocker arm 52, and upper and lower links 53 and 54. The upper link 53 has one end pivotally mounted to a rocker arm shaft 56 fixed to the cylinder head 3c, and the other end pivotally mounted to an upper end of the rocker arm 52 by an upper pin 55.

Further, a roller 57 is pivotally disposed on the upper pin 55 of the rocker arm 52. The roller 57 is in contact with a cam surface of the intake cam 6. As the intake cam 6 rotates, the roller 57 rolls on the intake cam 6 while being guided by the cam surface of the intake cam 6. As a result, the rocker arm 52 is vertically driven, and the upper link 53 is pivotally moved about the rocker arm shaft 56.

Furthermore, an adjusting bolt 52a is mounted to an end of the rocker arm 52 toward the intake valve 4. The adjusting bolt 52a is in contact with a stem 4e of the intake valve 4 and when the rocker arm 52 is vertically moved in accordance with rotation of the intake cam 6, the adjusting bolt 52a vertically drives the stem 4a to open and close the intake valve 4, against the urging force of the valve spring 4e.

Further, the lower link 54 has one end pivotally mounted to a lower end of the rocker arm 52 by a lower pin 58, and the other end of the lower link 54 has a connection shaft 59 pivotally mounted thereto. The lower link 54 is connected to a short arm 65, described hereinafter, of the lift actuator 60 by the connection shaft 59.

As shown in FIG. 6, the lift actuator 60, which is driven by the ECU 2, is comprised of a motor 61, a nut 62, a link 63, a long arm 64, and the short arm 65. The motor 61 is connected to the ECU 2, and disposed outside a head cover 3g of the engine 3. The rotational shaft of the motor 61 is a screw shaft 61a formed with a male screw and the nut 62 is screwed onto the screw shaft 61a. The link 63 has one end pivotally mounted to the nut 62 by a pin 63a, and the other end pivotally mounted to one end of the long arm 64 by a pin 63b. Further, the other end of the long arm 64 is attached to one end of the short arm 65 by a pivot shaft 66. The pivot shaft 66 is circular in cross section, and is pivotally supported by the head cover 3g of the engine 3. The long arm 64 and the short arm 65 are pivotally moved about the pivot shaft 66 in unison with the pivot shaft 66.

Furthermore, the aforementioned connection shaft 59 pivotally extends through an end of the short arm 65 on a side opposite to the pivot shaft 66, whereby the short arm 65 is connected to the lower link 54 by the connection shaft 59.

Next, a description will be given of the operation of the variable valve lift mechanism 50 configured as above. In the variable valve lift mechanism 50, when a lift control input Uliftin (first control input), described hereinafter, is input from the ECU 2 to the lift actuator 60, the screw shaft 61a of the motor 61 rotates, and the nut 62 is moved in accordance with the rotation of the screw shaft 61a, whereby the long arm 64 and the short arm 65 are pivotally moved about the pivot shaft 66, and in accordance with the motion of the connecting shaft 59 caused by the pivotal motion of the short arm 65, the lower link 54 of the rocker arm mechanism 51 is pivotally moved about the lower pin 58. That is, the lower link 54 is driven by the lift actuator 60.

Figure 5:
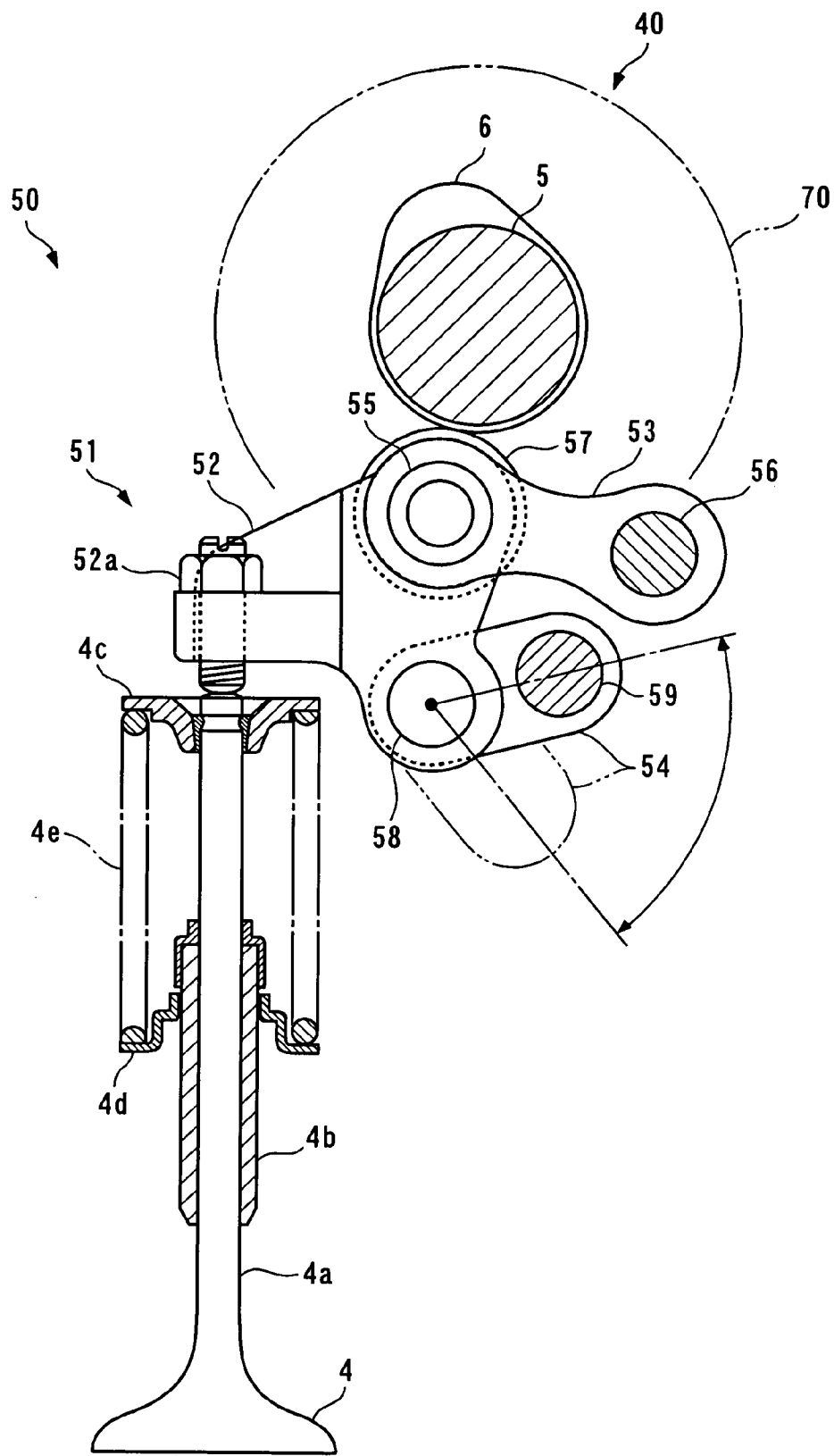
FIG. 5 is a schematic cross-sectional view of a variable valve lift mechanism of the variable intake valve-actuating mechanism.
Figure 6A:
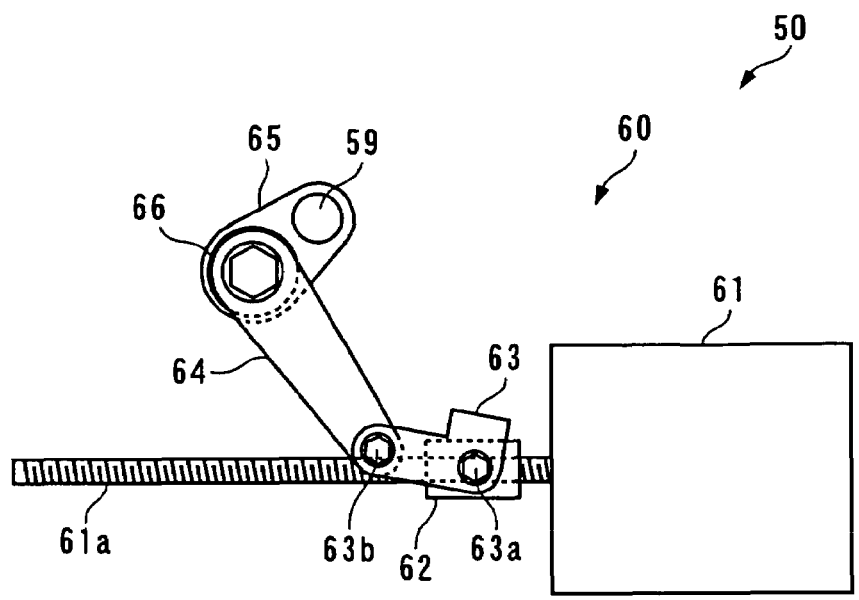
FIG. 6A is a diagram showing a lift actuator in a state in which a short arm thereof is in a maximum lift position.
Figure 6B:
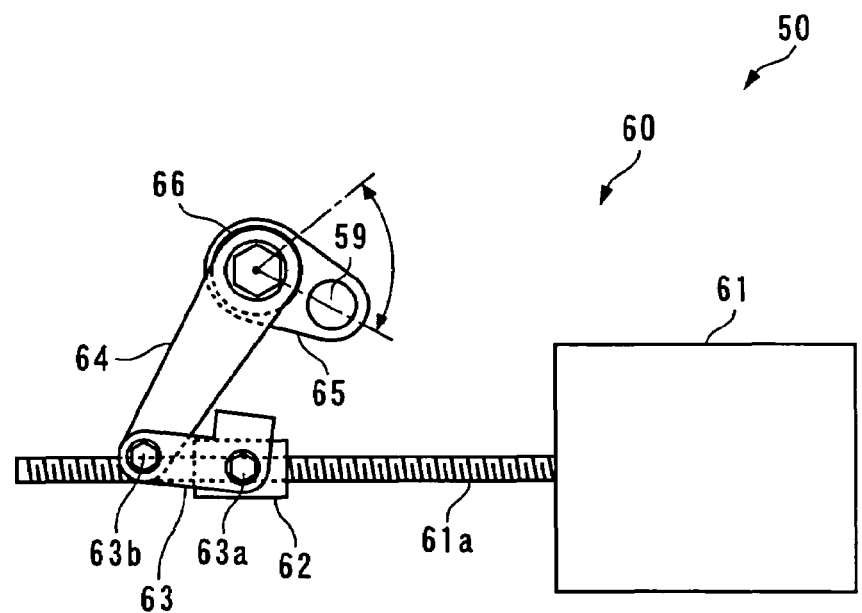
FIG. 6B is a diagram showing the lift actuator in a state in which the short arm thereof is in a minimum lift position.

During the above process, under the control of the ECU 2, the range of pivotal motion of the short arm 65 is restricted between the maximum lift position shown in FIG. 6A and the minimum lift position shown in FIG. 6B, whereby the range of pivotal motion of the lower link 54 is also restricted between the maximum lift position indicated by a solid line in FIG. 5 and the minimum lift position indicated by a two-dot chain line in FIG. 5.

Figure 7A:
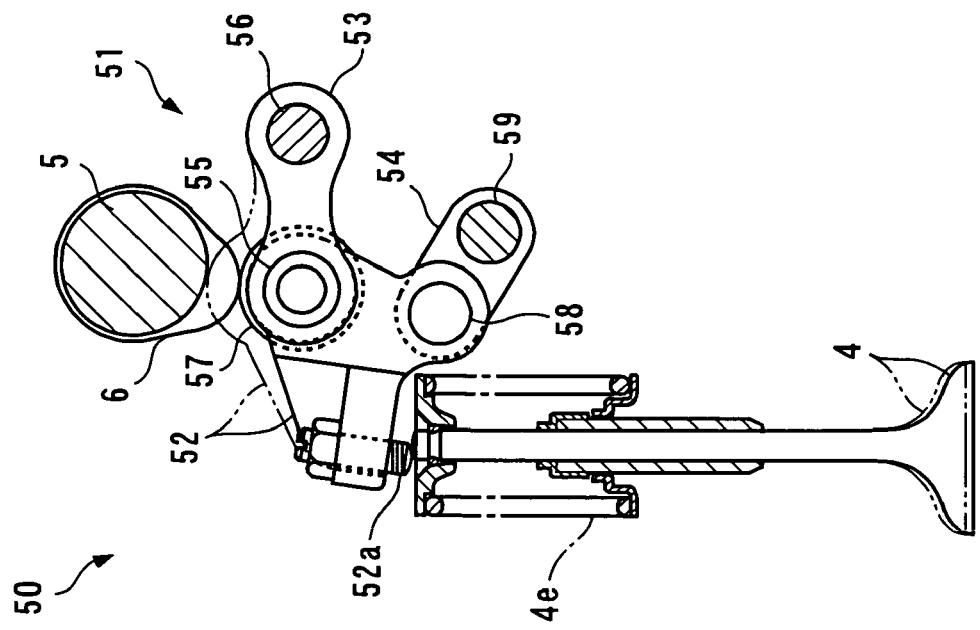
FIG. 7A is a diagram showing an intake valve placed in an open state when a lower link of the variable valve lift mechanism is in a maximum lift position.

The rocker arm mechanism 51 is configured such that when the lower link 54 is in the maximum lift position, the distance between the center of the upper pin 55 and the center of the lower pin 58 becomes longer than the distance between the center of the rocker arm shaft 56 and the center of the connection shaft 59, whereby as shown in FIG. 7A, when the intake cam 6 rotates, the amount of movement of the adjusting bolt 52a becomes larger than the amount of movement of a contact point where the intake cam 6 and the roller 57 are in contact with each other.

Figure 7B:
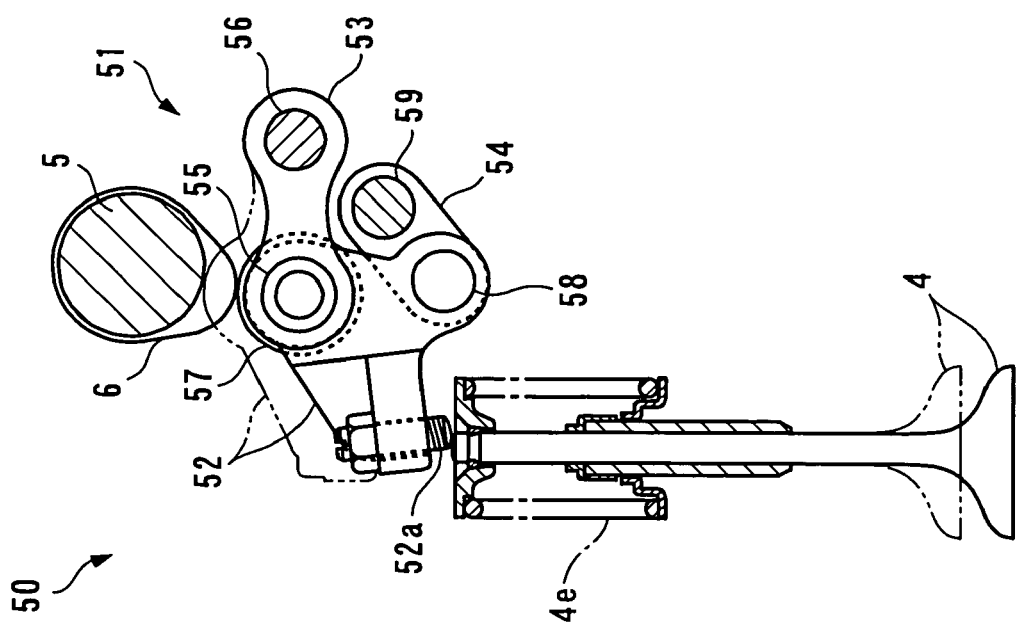
FIG. 7B is a diagram showing the intake valve placed in the open state when the lower link of the variable valve lift mechanism is in a minimum lift position.

On the other hand, the rocker arm mechanism 51 is configured such that when the lower link 54 is in the minimum lift position, the distance between the center of the upper pin 55 and the center of the lower pin 58 becomes shorter than the distance between the center of the rocker arm shaft 56 and the center of the connection shaft 59, whereby as shown in FIG. 7B, when the intake cam 6 rotates, the amount of movement of the adjusting bolt 52a becomes smaller than the amount of movement of the contact point where the intake cam 6 and the roller 57 are in contact with each other.

For the above reason, when the lower link 54 is in the maximum lift position, the intake valve 4 is opened with a larger valve lift Liftin than when the lower link 54 is in the minimum lift position. More specifically, during rotation of the intake cam 6, when the lower link 54 is in the maximum lift position, the intake valve 4 is opened according to a valve lift curve indicated by a solid line in FIG. 8, and the valve lift Liftin assumes its maximum value Liftin_H. On the other hand, when the lower link 54 is in the minimum lift position, the intake valve 4 is opened according to a valve lift curve indicated by a two-dot chain line in FIG. 8, and the valve lift Liftin assumes its minimum value Liftin_L.

As described above, in the variable valve lift mechanism 50, the lower link 54 is pivotally moved by the lift actuator 60 between the maximum lift position and the minimum lift position, whereby it is possible to continuously change the valve lift Liftin between the maximum value Liftin_H and the minimum value Liftin_L. Further, as described above, the variable valve lift mechanism 50 uses the motor 61 as a drive source thereof, and hence the response speed of the pivot angle of the short arm 65 with respect to the lift control input Uliftin is relatively high.

The engine 3 is provided with a pivot angle sensor 22 (see FIG. 3). The pivot angle sensor 22 detects a pivot angle θ lift of the short arm 65 and delivers a signal indicative of the detected pivot angle of the short arm 65 to the ECU 2. The pivot angle θ lift of the short arm 65 indicates a position of the short arm 65 between the maximum lift position and the minimum lift position. The ECU 2 calculates the valve lift Liftin based on the pivot angle θ lift.

Figure 9:
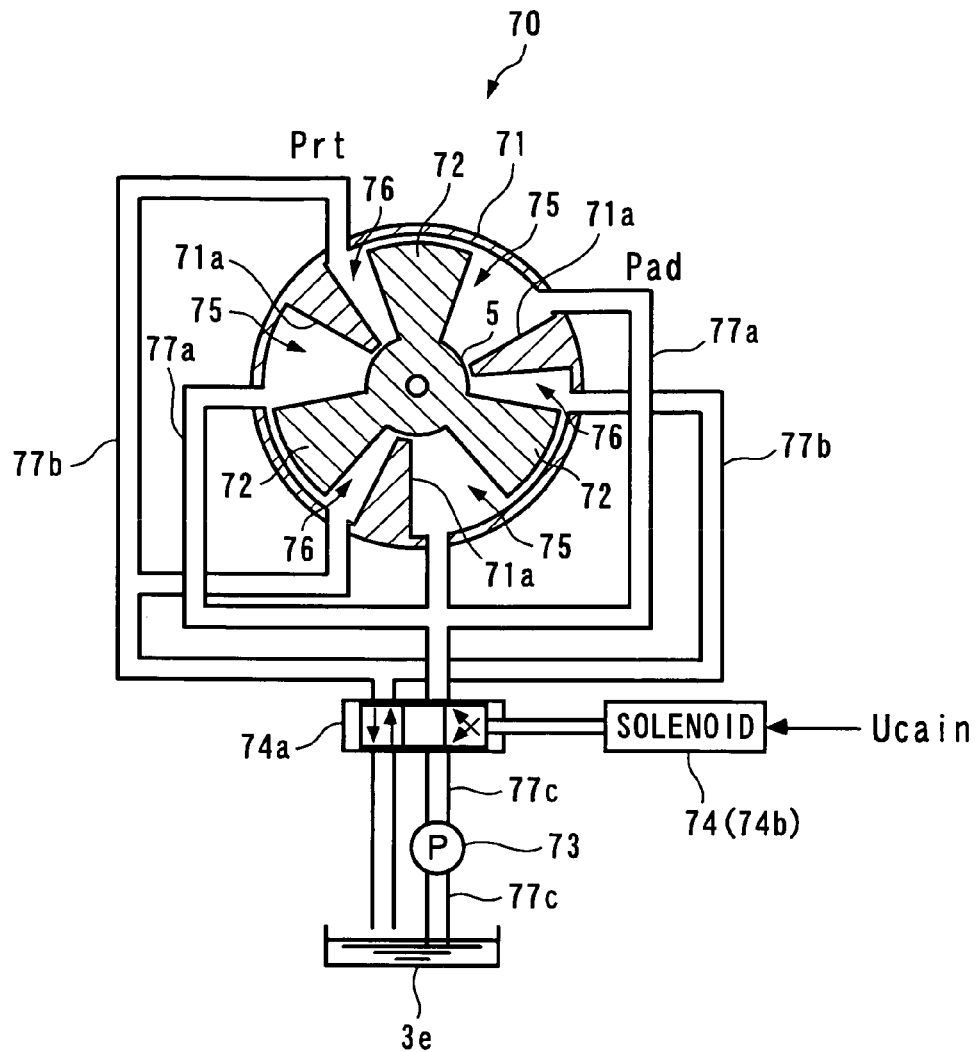
FIG. 9 is a schematic diagram of a variable cam phase mechanism.
Figure 10:
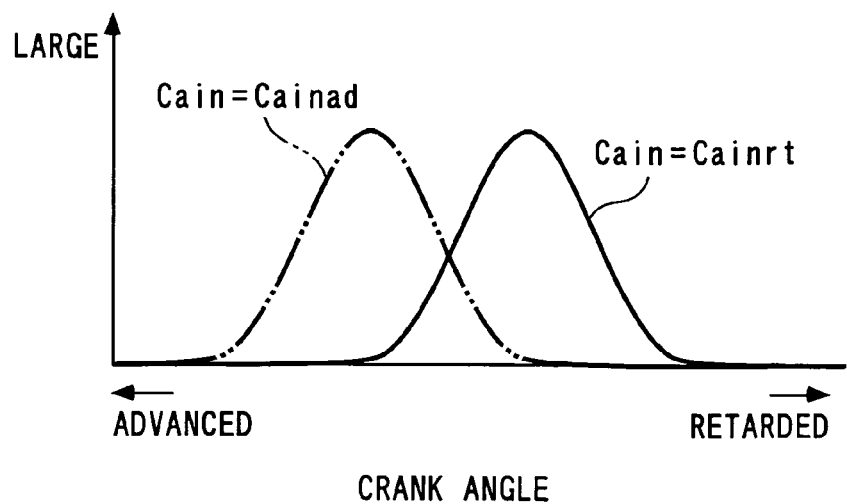
FIG. 10 is a diagram showing a valve lift curve (solid line) obtained when a cam phase is set to a most retarded value by the variable cam phase mechanism, and a valve lift curve (two-dot chain line) obtained when the cam phase is set to a most advanced value by the variable cam phase mechanism.

Next, the aforementioned variable cam phase mechanism 70 will be described with reference to FIGS. 9 and 10. The variable cam phase mechanism 70 is provided for continuously advancing or retarding the relative phase Cain of the intake camshaft 5 with respect to the crankshaft 3d (hereinafter referred to as "the cam phase Cain") to thereby continuously change the valve timing of the intake valve 4, and is mounted on an intake sprocket-side end of the intake camshaft 5. As shown in FIG. 9, the variable cam phase mechanism 70 includes a housing 71, a three-bladed vane 72, an oil pressure pump 73, and a solenoid valve mechanism 74.

The housing 71 is integrally formed with the intake sprocket on the intake camshaft 5, and divided by three partition walls 71a formed at equal intervals. The vane 72 is coaxially mounted on the end of the intake camshaft 5 where the intake sprocket is mounted, such that the blades of the vane 72 radially extends outward from the intake camshaft 5, and are rotatably housed in the housing 71. Further, the housing 71 has three advance chambers 75 and three retard chambers 76 each formed between one of the partition walls 71a and one of the three blades of the vane 72.

The oil pressure pump 73 is a mechanically-driven type which is connected to the crankshaft 3d. As the crankshaft 3d rotates, the oil pressure pump 73 draws lubricating oil stored in an oil pan 3e of the engine 3 via a lower part of an oil passage 77c, for pressurization, and supplies the pressurized oil to the solenoid valve mechanism 74 via the remaining part of the oil passage 77c.

The solenoid valve mechanism 74 is formed by combining a spool valve mechanism 74a and a solenoid 74b, and is connected to the advance chambers 75 and the retard chambers 76 via an advance oil passage 77a and a retard oil passage 77b such that oil pressure supplied from the oil pressure pump 73 is delivered to the advance chambers 75 and the retard chambers 76 as advance oil pressure Pad and retard oil pressure Prt, respectively. The solenoid 74b of the solenoid valve mechanism 74 is connected to the ECU 2. When a phase control input Ucain (second control input), described hereinafter, is input from the ECU 2, the solenoid 74b moves a spool valve element of the spool valve mechanism 74a within a predetermined range of motion according to the phase control input Ucain to thereby change both the advance oil pressure Pad and the retard oil pressure Prt.

In the variable cam phase mechanism 70 configured as above, during operation of the oil pressure pump 73, the solenoid valve mechanism 74 is operated according to the phase control input Ucain, to supply the advance oil pressure Pad to the advance chambers 75 and the retard oil pressure Prt to the retard chambers 76, whereby the relative phase of the vane 72 with respect to the housing 71 is changed toward an advanced side or a retarded side. As a result, the cam phase Cain described above is continuously changed between a most retarded value Cainrt (value corresponding to a cam angle of e.g. 0°) and a most advanced value Cainad (value corresponding to a cam angle of e.g. 55°), whereby the valve timing of the intake valves 4 is continuously changed between most retarded timing indicated by a solid line in FIG. 10 and most advanced timing indicated by a two-dot chain line in FIG. 10. Further, as described above, the variable cam phase mechanism 70 uses the oil pressure pump 73 as a drive source thereof, and hence the response speed of the cam phase Cain with respect to the phase control input Ucain is lower than the response speed of the pivot angle θ lift of the short arm 65 with respect to the lift control input Uliftin of the variable valve lift mechanism 50.

As described above, in the variable intake valve-actuating mechanism 40 of the present embodiment, the variable valve lift mechanism 50 continuously changes the valve lift Liftin, and the variable cam phase mechanism 70 continuously changes the cam phase Cain, i.e. the valve timing of the intake valves 4 between the most retarded timing and the most advanced timing, described hereinbefore. Further, as described hereinafter, the ECU 2 controls the valve lift Liftin and the cam phase Cain via the variable valve lift mechanism 50 and the variable cam phase mechanism 70.

On the other hand, a cam angle sensor 23 (see FIG. 3) (operation amount-detecting means) is disposed at an end of the intake camshaft 5 opposite from the variable cam phase mechanism 70. The cam angle sensor 23 is implemented e.g. by a magnet rotor and an MRE pickup, for delivering a CAM signal, which is a pulse signal, to the ECU 2 along with rotation of the intake camshaft 5. Each pulse of the CAM signal is generated whenever the intake camshaft 5 rotates through a predetermined cam angle (e.g. 1°). The ECU 2 calculates the cam phase Cain based on the CAM signal and the CRK signal, described above.

Further, a LAF sensor 24 is inserted into the exhaust pipe 13 of the engine 3. The LAF sensor 24 linearly detects the concentration of oxygen in exhaust gases, and delivers a signal indicative of the sensed oxygen concentration to the ECU 2. The ECU 2 calculates an actual air-fuel ratio A/F indicative of the air-fuel ratio of a mixture burned in the engine 3, based on the signal from the LAF sensor 24. It should be noted that the actual air-fuel ratio A/F is calculated as an equivalent ratio.

Further, an accelerator pedal opening sensor 25 detects the amount AP of operation (stepped-on amount) of an accelerator pedal, not shown (hereinafter referred to as "the accelerator pedal opening AP"), and delivers a signal indicative of the sensed accelerator pedal opening AP to the ECU 2. A vehicle speed sensor 26 (vehicle speed-detecting means) detects a vehicle speed VP, which is a traveling speed of the vehicle V, and delivers a signal indicative of the sensed vehicle speed VP to the ECU 2. Furthermore, the transmission 80 has a gear position sensor 27 mounted thereon. The gear position sensor 27 detects a gear position of the transmission 80, and delivers a signal indicative of a shift position NGR corresponding to the sensed gear position to the ECU 2. The ECU 2 calculates a transmission ratio G_ratio of the transmission 80 based on the shift position NGR.

The ECU 2 is implemented by a microcomputer comprised of a CPU, a RAM, a ROM and an I/O interface (none of which are specifically shown). The ECU 2 controls the operations of the engine 3 and the transmission 80 based on the signals from the aforementioned sensors 20 to 27.

It should be noted that in the present embodiment, the ECU 2 corresponds to first control input-calculating means, load parameter-detecting means, demanded acceleration degree parameter-calculating means, output priority-type calculating means, fuel economy priority-type calculating means, selection means, second control input-calculating means, drive wheel demanded torque-calculating means, traveling resistance-calculating means, drive wheel torque-detecting means, acceleration-detecting means, reference traveling resistance-calculating means, reference acceleration resistance-calculating means, and correction value-calculating means.

Next, a description will be given of the outline of a control process executed by the ECU 2. First, the ECU 2 calculates an output Bmep_cmd (load parameter) demanded of the engine 3 (hereinafter referred to as "the engine demanded output Bmep_cmd") (see FIG. 11), and an acceleration demand reference value G_jud indicative of the presence or absence of a demand of acceleration (see FIG. 13). Further, the ECU 2 calculates the phase control input Ucain for controlling the variable cam phase mechanism 70 e.g. based on the calculated the engine demanded output Bmep_cmd and acceleration demand reference value G_jud (see FIG. 15), and calculates the lift control input Uliftin for controlling the variable valve lift mechanism 50, based on the calculated cam phase Cain (see FIG. 18). It should be noted that all the processes described hereinafter will be executed at a predetermined control period T (e.g. 10 msec).

Figures 11, 12:
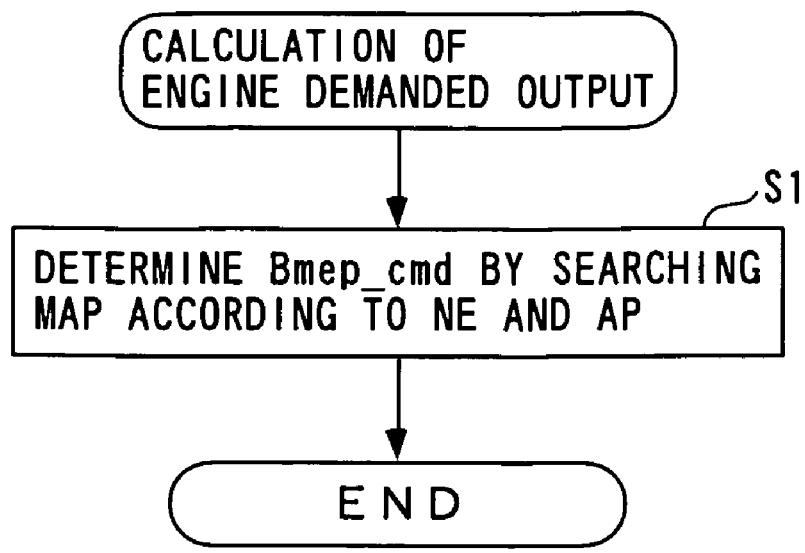
FIG. 11 is a flowchart of a process for calculating an engine demanded output.
FIG. 12 is a diagram showing an example of a map for use in calculating the engine demanded output.

In the FIG. 11 process for calculating the engine demanded output Bmep_cmd, in a step 1 (shown as S1 in abbreviated form in FIG. 11; the following steps are also shown in abbreviated form), the engine demanded output Bmep_cmd is calculated by searching a map shown in FIG. 12 according to the engine speed NE and the accelerator pedal opening AP. In this map, the engine demanded output Bmep_cmd is set to a larger value as the engine speed NE is higher and the accelerator pedal opening AP is higher. It should be noted that the engine demanded output Bmep_cmd is calculated as a net average effective pressure.

Figure 13:
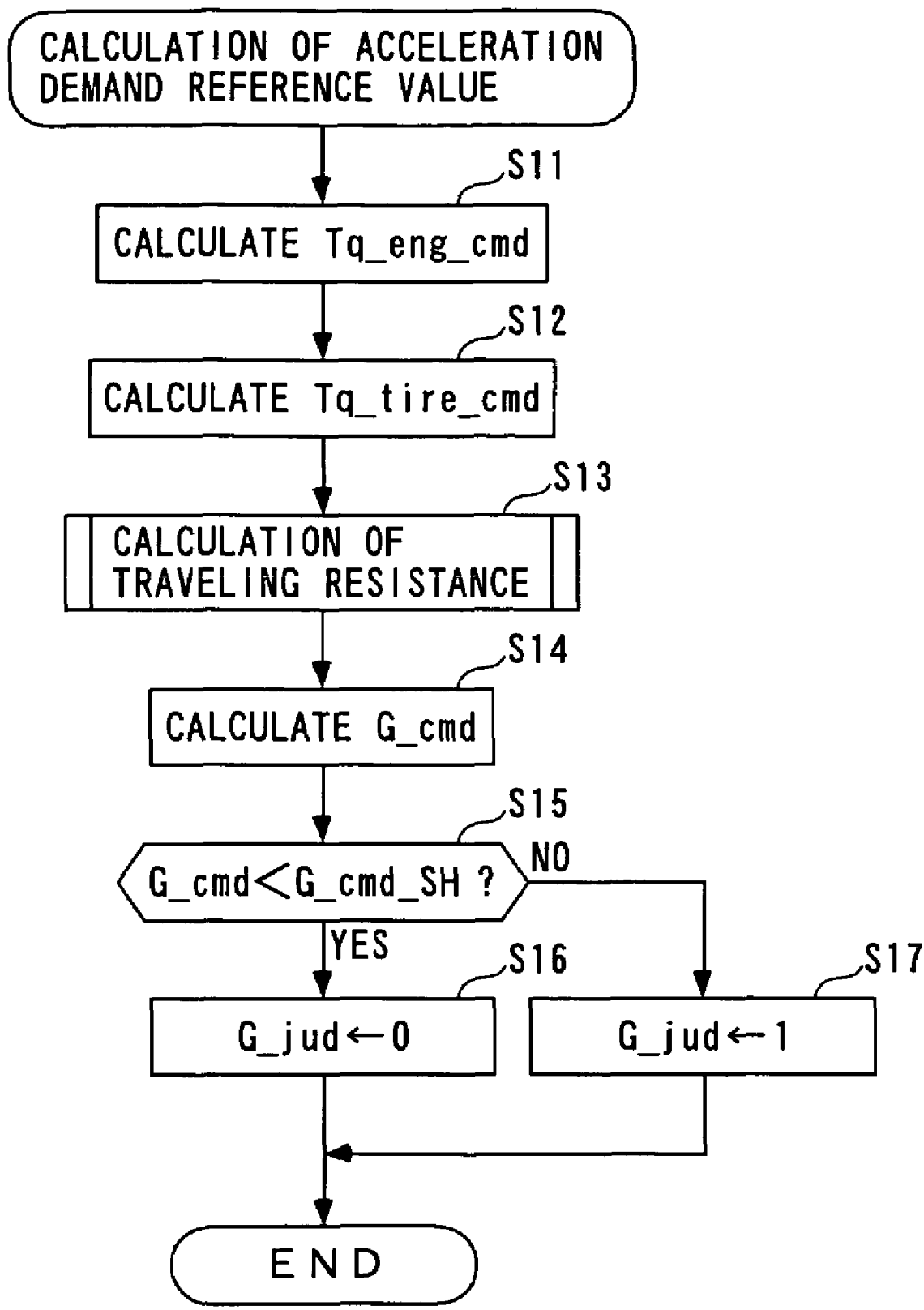
FIG. 13 is a flowchart of a process for calculating an acceleration demand reference value.

Next, the process for calculating the above-described acceleration demand reference value G_jud will be described with reference to FIG. 13. First, in a step 11, a torque Tq_eng_cmd demanded of the engine 3 (hereinafter referred to as "the engine demanded torque Tq_eng_cmd") is calculated using the engine demanded output Bmep_cmd calculated in the step 1, by the following equation (1):

$$Tq\_eng\_cmd = (Bmep\_cmd \times DI)/(Stroke \times \pi) \quad (1)$$

wherein DI represents the displacement of the engine 3, Stroke represents the number of strokes of the engine 3, which is equal to 4 in the present embodiment, and $\pi$ represents the ratio of the circumference of a circle.

Then, in a step 12, a torque Tq_tire_cmd demanded of the drive wheels W and W (hereinafter referred to as "the drive wheel demanded torque Tq_tire_cmd") is calculated e.g. using the calculated engine demanded torque Tq_eng_cmd and the aforementioned transmission ratio G_ratio by the following equation (2):

$$Tq\_tire\_cmd = Tq\_eng\_cmd \times \eta \times G\_ratio \times F\_ratio / Tire\_R \quad (2)$$

wherein $\eta$ represents a predetermined power loss e.g. in the transmission 80, F_ratio represents a reduction ratio of a final speed reduction gear, not shown, and Tire_R represents the radius of the drive wheels W and W. It should be noted that the drive wheel demanded torque Tq_tire_cmd is represented by a force (N).

Figure 14:
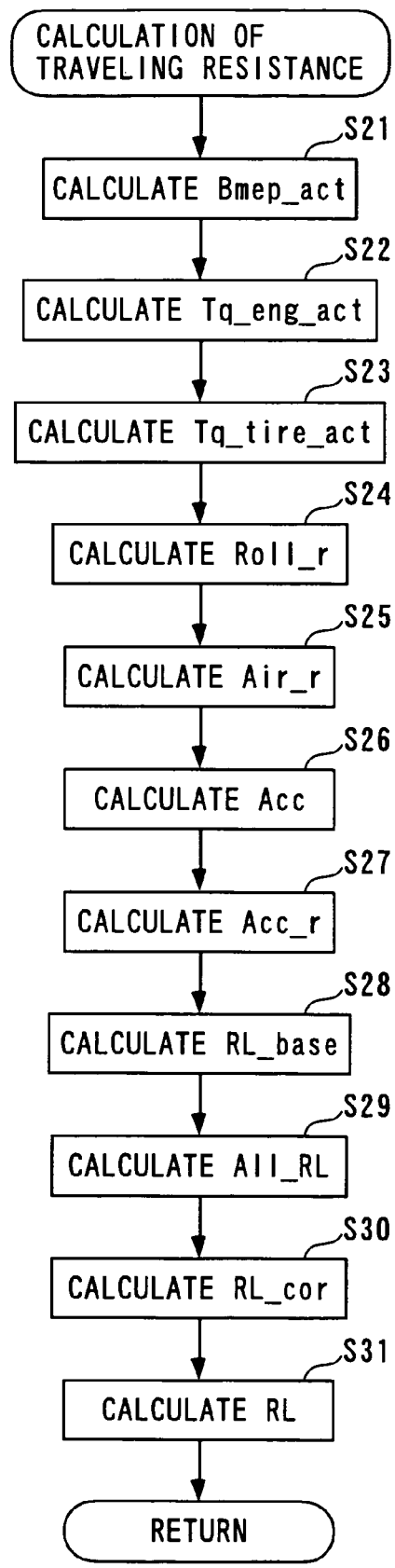
FIG. 14 is a flowchart of a process for calculating a traveling resistance.

Next, a traveling resistance RL of the vehicle is calculated (step 13). FIG. 14 shows the process for calculating the traveling resistance RL. First, in a step 21, an actual output Bmep_act of the engine 3 (hereinafter referred to as "the engine output Bmep_act") is calculated. The engine output Bmep_act is calculated by searching a map, not shown, according to the intake air amount QA, the air-fuel ratio A/F, and the ignition timing. This map is formed by empirically determining the relationship between the engine output Bmep_act, the intake air amount QA, the air-fuel ratio A/F, and the ignition timing, and then mapping the relationship. It should be noted that the engine output Bmep_act is calculated as a net average effective pressure.

Then, in a step 22, an actual torque Tq_eng_act of the engine 3 (hereinafter referred to as "the engine torque Tq_eng_act") is calculated using the calculated engine output Bmep_act and the aforementioned engine displacement DI and stroke number Stroke, by the following equation (3):

$$Tq\_eng\_act = (Bmep\_act \times DI)/(Stroke \times \pi) \quad (3)$$

Next, in a step 23, an actual torque Tq_tire_act of the drive wheels W and W (hereinafter referred to as "the drive wheel torque Tq_tire_act") is calculated using the calculated engine torque Tq_eng_act, the transmission ratio G_ratio, the power loss $\eta$, the reduction ratio F_ratio of the final speed reduction gear, and the radius Tire_R of the drive wheels W and W, by the following equation (4):

$$Tq\_tire\_act = Tq\_eng\_act \times \eta \times G\_ratio \times F\_ratio / Tire\_R \quad (4)$$

Then, in a step 24, a reference rolling resistance Roll_r is calculated by the following equation (5):

$$Roll\_r = \mu R \times Weight \quad (5)$$

wherein $\mu R$ represents a value obtained by multiplying a friction coefficient obtained when the vehicle V travels on an asphalt road surface by the gravitational acceleration (hereinafter referred to as "the reference friction coefficient"), and is set to a predetermined value. Further, Weight represents the weight of the vehicle V with one occupant and no baggage loaded thereon (hereinafter referred to as "the reference vehicle weight"), and is set to a predetermined value.

Next, in a step 25, reference air resistance Air_r is calculated using the vehicle speed VP by the following equation (6):

$$\text{Air\_r} = \mu A \times A \times VP^2 \tag{6}$$

wherein μA and A represent an air resistance coefficient (hereinafter referred to as "the reference air resistance coefficient") and a front projection area of the vehicle V (hereinafter referred to as "the reference front projection area"), which are obtained when the vehicle V has no spoiler or no carrier mounted thereon, respectively.

Then, in a step 26, the acceleration Acc of the vehicle V (hereinafter referred to as "the vehicle acceleration Acc") is calculated using the current value VP of the vehicle speed and the immediately preceding value VPZ of the same (vehicle speed VP obtained in the immediately preceding control timing), and the control period T of the present process, by the following equation (7):

$$\text{Acc} = (VP - VPZ)/T \tag{7}$$

Next, a reference acceleration resistance Acc_r is calculated by dividing the calculated vehicle acceleration Acc by the reference vehicle weight Weight (step 27).

The reference acceleration resistance Acc_r corresponds to acceleration resistance obtained when the weight of the vehicle V is equal to the reference vehicle weight Weight.

Then, the sum of the reference rolling resistance Roll_r obtained in the step 24 and the reference air resistance Air_r obtained in the step 25 is calculated as a reference traveling resistance RL_base (step 28). The reference traveling resistance RL_base corresponds to a traveling resistance obtained when the weight of the vehicle V is equal to the reference vehicle weight Weight, the friction coefficient of a road surface to the reference friction coefficient μR, the air resistance coefficient to the reference air resistance coefficient μA, and the front projection area of the vehicle V to the reference front projection area A, and the road surface is horizontal (gradient=0, i.e. gradient resistance=0).

Next, a total reference traveling resistance ALL_RL is calculated by adding the reference acceleration resistance Acc_r calculated in the above-described step 27 to the calculated reference traveling resistance RL_base (step 29).

Then, using the calculated total reference traveling resistance ALL_RL and the drive wheel torque Tq_tire_act calculated in the step 23, a correction value RL_cor for correcting the reference traveling resistance RL_base is calculated as follows (step 30).

First, the difference dRL (Tq_tire_act−ALL_RL) between the drive wheel torque Tq_tire_act and the total reference traveling resistance ALL_RL is calculated. Then, the correction value RL_cor is calculated using the calculated difference dRL by the following equation (8):

$$RL\_cor = \alpha \times dRL + (1-\alpha) \times RL\_corZ \tag{8}$$

wherein RL_corZ represents the immediately preceding value of the correction value, and α represents a predetermined averaging coefficient, which is set to 0.03, for example.

As described above, the correction value RL_cor is calculated as the weighted average of the difference dRL and the immediately preceding value RL_corZ of the correction value. The reason for calculating the correction value RL_cor is to eliminate the error of computations caused by temporary noises which can be contained in the signals output from the sensors, and further, because the actual traveling resistance is not instantaneously changed and hence it is possible to obtain an appropriate correction value RL_cor even by such a calculation as described above.

It should be noted that when the difference (VPZ−VP) between the immediately preceding value VPZ of the vehicle speed VP and the current value of the same is larger than a predetermined value, the correction value RL_cor is set to the immediately preceding value RL_corZ thereof without calculating the correction value RL_cor by the aforementioned equation (8). This is because in the above-mentioned case (VPZ−VP>the predetermined value), i.e. when the driver is decelerating the vehicle V by a brake operation, a deceleration resistance is contained in the reference acceleration resistance Acc_r calculated in the step 27, so that it is impossible to properly calculate the reference acceleration resistance Acc_r, which makes it impossible to properly calculate the correction value RL_cor.

Next, the traveling resistance RL is calculated by adding the calculated correction value RL_cor to the reference traveling resistance RL_base (step 31), followed by terminating the present process.

Referring again to FIG. 13, in a step 14 following the step 13, an acceleration G_cmd demanded of the engine 3 (hereinafter referred to as "the demanded acceleration G_cmd") (demanded acceleration degree parameter) is calculated using the reference vehicle weight Weight, the drive wheel demanded torque Tq_tire_cmd calculated in the step 12, and the traveling resistance RL calculated in the step 31, by the following equation (9):

$$G\_cmd = (Tq\_tire\_cmd - RL)/\text{Weight} \tag{9}$$

Next, it is determined whether or not the calculated demanded acceleration G_cmd is smaller than a predetermined threshold value G_cmd_SH (step 15). The threshold value G_cmd_SH is set to a slightly larger value than acceleration obtained during slow acceleration and cruising of the vehicle. For example, it is set to 0.1 m/s².

If the answer to the question of the step 15 is affirmative (YES), it is judged that acceleration is not demanded, and the acceleration demand reference value G_jud is set to 0 (calculated to 0) (step 16), followed by terminating the present process. On the other hand, if the answer to the question of the step 15 is negative (NO), it is judged that acceleration is demanded, and the acceleration demand reference value G_jud is set to 1 (calculated to 1) (step 17), followed by terminating the present process. As described above, when acceleration is demanded, the acceleration demand reference value G_jud is set to 1, and otherwise to 0.

Figure 15:
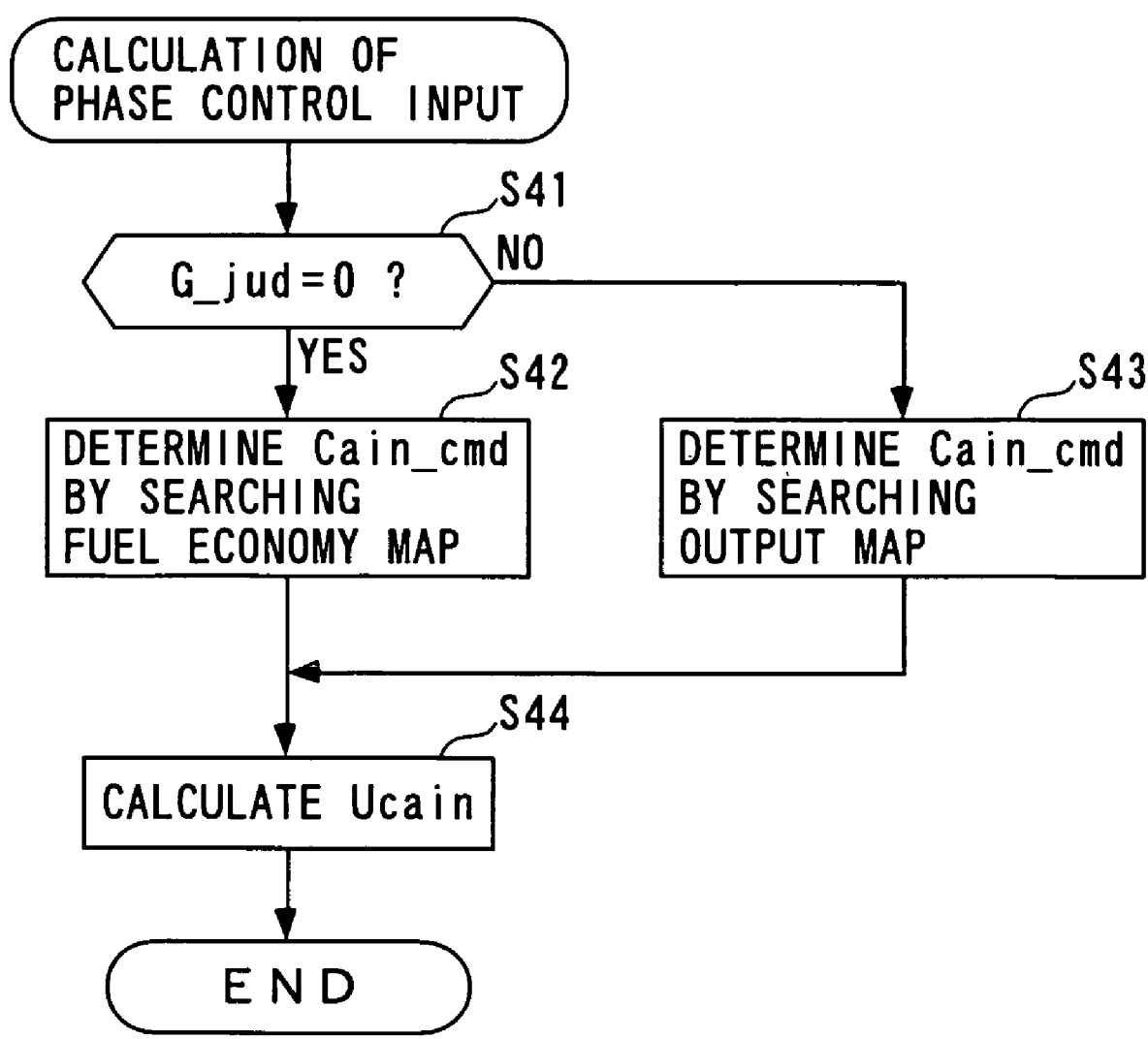
FIG. 15 is a flowchart of a process for calculating a phase control input.

FIG. 15 shows a process for calculating the phase control input Ucain for use in controlling the aforementioned variable cam phase mechanism 70. First, in a step 41, it is determined whether or not the acceleration demand reference value G_jud set in the step 16 or 17 is equal to 0. If the answer to this question is affirmative (YES), i.e. if acceleration is not demanded, a fuel economy map value Cain_M_FC is calculated by searching a fuel economy map shown in FIG. 16 according to the engine speed NE and the engine demanded output Bmep_cmd, and the calculated fuel economy map value Cain_M FC is set to a target cam phase Cain_cmd (step 42).

In the above-described fuel economy map, the fuel economy map value Cain_N_FC is set to a retarded value so as to ensure stable combustion in a low load region where the engine demanded output Bmep_cmd is small and a low engine speed region where the engine speed NE is low. Further, in a medium or medium-to-high engine speed region where the engine demanded output Bmep_cmd is medium, the fuel economy map value Cain_M_FC is set to an advanced value so as to improve fuel economy by reducing the pumping loss due to internal EGR. Furthermore, in a high load region where the engine demanded output Bmep_cmd is large, the fuel economy map value Cain_M_FC is set to a retarded value so as to ensure a large amount of fresh (intake) air.

On the other hand, if the answer to the question of the step 41 is negative (NO), i.e. if the acceleration demand reference value G_jud is equal to 1, which means that acceleration is demanded, an output map value Cain_M_P is calculated by searching an output map shown in FIG. 17 according to the engine speed NE and the engine demanded output Bmep_cmd, and the calculated output map value Cain_N_P is set to the target cam phase Cain_cmd (step 43). In this output map, the output map value Cain_N_P is basically set to have the same tendency as that of the fuel economy map value Cain_N_FC with respect to the engine speed NE and the engine demanded output Bmep_cmd, and is set to a more retarded value than the fuel economy map value Cain_N_FC, as a whole, so as to obtain a larger intake air amount QA for obtaining a larger output of the engine 3.

In a step 44 following the above-described step 42 or 43, the phase control input Ucain is calculated according to the difference between the calculated target cam phase Cain_cmd and the cam phase Cain with a predetermined feedback control algorithm, such as a PID control algorithm, followed by terminating the present process. The phase control input Ucain calculated as above is input to the variable cam phase mechanism 70, whereby the cam phase Cain is controlled such that it becomes equal to the target cam phase Cain_cmd.

Figures 18, 19:
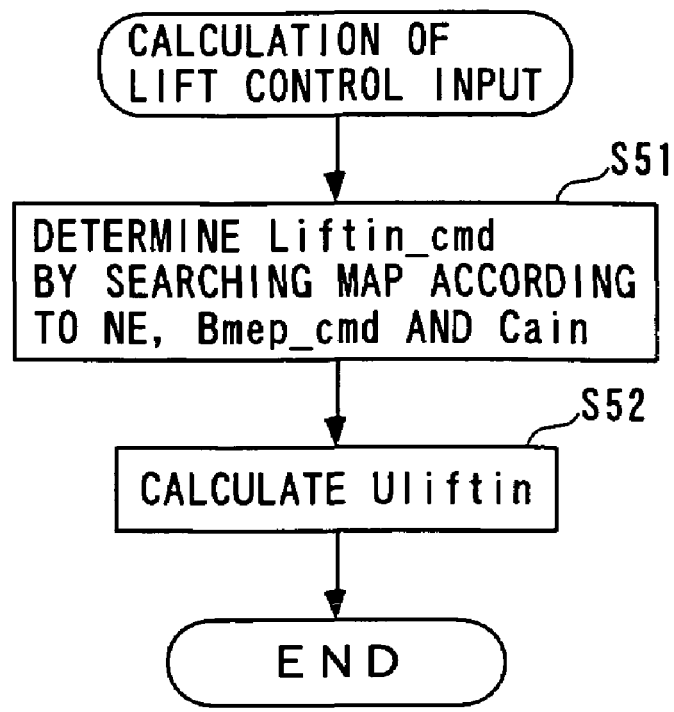
FIG. 18 is a flowchart of a process for calculating a lift control input.
FIG. 19 is a diagram showing an example of a Liftincmd map.

FIG. 18 shows a process for calculating the aforementioned lift control input Uliftin. First, in a step 51, a target valve lift Liftin_cmd is calculated by searching a Liftincmd map shown in FIG. 19 according to the engine speed NE, the engine demanded output Bmep_cmd, and the cam phase Cain. In this map, a plurality of predetermined values of the cam phase Cain (only one of which is shown in FIG. 19) are set between the most retarded value Cainrt and the most advanced value Cainad, mentioned hereinabove, and when the cam phase Cain is not equal to any of the predetermined values, the target valve lift Liftin_cmd is calculated by interpolation.

The Liftincmd map is prepared by empirically determining the relationship between the valve lift Liftin, the engine speed NE, the engine demanded output Bmep_cmd, and the cam phase Cain, and mapping the relationship. In the Liftincmd map, the target valve lift Liftin_cmd is set to a value enabling the engine demanded output Bmep_cmd to be obtained, with respect to the current cam phase Cain.

More specifically, the target valve lift Liftin_cmd is set to a larger value as the engine speed NE is higher, or as the engine demanded output Bmep_cmd is larger and the load on the engine 3 is higher, so as to obtain a larger intake air amount QA for obtaining a larger output of the engine 3. Further, the target valve lift Liftin_cmd is set to a larger value as the cam phase Cain is more advanced. This is because as the cam phase Cain is more advanced, the speed of each piston 3*b* is lower during opening of the intake valve 4, and the internal EGR amount is larger, whereby the intake air amount QA becomes smaller with respect to the same valve lift Liftin. Therefore, the target valve lift Liftin_cmd is set to a larger value so as to compensate for the smaller intake air amount QA.

In a step 52 following the step 51, the lift control input Uliftin is calculated according to the difference between the calculated target valve lift Liftin_cmd and the valve lift Liftin with a predetermined feedback control algorithm, such as a PID control algorithm, followed by terminating the present process. The lift control input Uliftin calculated as above is input to the variable valve lift mechanism 50, whereby the valve lift Liftin is controlled such that it becomes equal to the target valve lift Liftin_cmd.

The engine output Bmep_act is controlled to the engine demanded output Bmep_cmd through control using the phase control input Ucain and the lift control input Uliftin, described above.

Figure 20A:
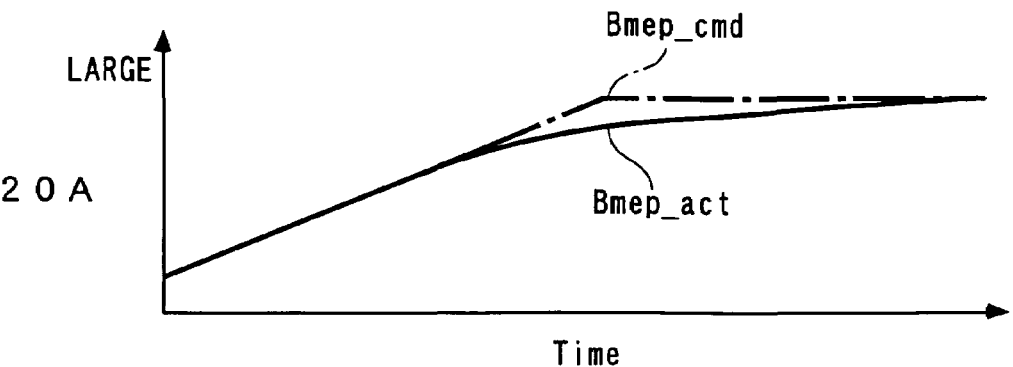
FIG. 20A is a view showing results of control in which a target cam phase is calculated using only the fuel economy map.

Next, the results of control by the control system 1 will be described in comparison with a comparative example with reference to FIGS. 20A and 20B. The comparative example shown in FIG. 20A is an example of results of control obtained when the target cam phase Cain_cmd is calculated using the aforementioned fuel economy map alone, similarly to the control by the conventional control system. According to the results of the comparison, although the engine demanded output Bmep_cmd is suddenly increased by a demand of acceleration, response delay of the variable cam phase mechanism 70 cannot be sufficiently compensated for and therefore the intake air amount QA cannot be sufficiently obtained. This causes response delay of the engine output Bmep_act with respect to the engine demanded output Bmep_cmd.

Figure 20B:
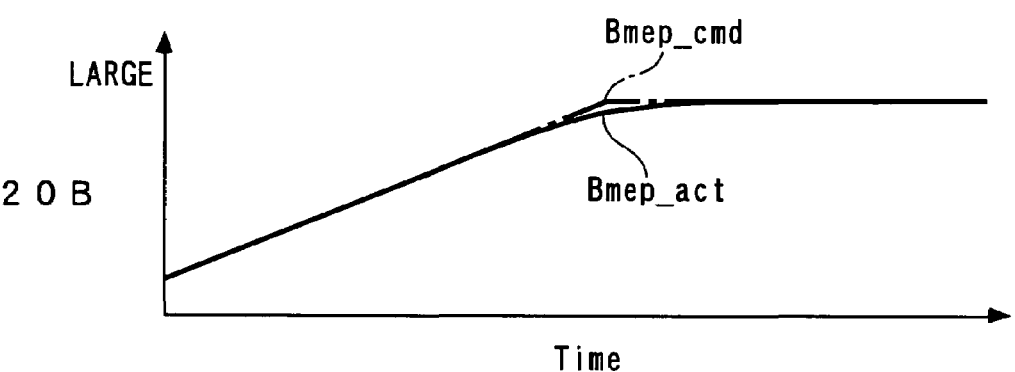
FIG. 20B is a view showing an example of the results of control by the control system according to the present embodiment.

In contrast, as shown in FIG. 20B, according to the results of control by the control system 1, when the engine demanded output Bmep_cmd is suddenly increased by a demand of acceleration, the engine output Bmep_act quickly responds to the engine demanded output Bmep_cmd, whereby it was confirmed that it is possible to obtain high responsiveness of the engine output Bmep_act to a demand of acceleration.

Figure 21:
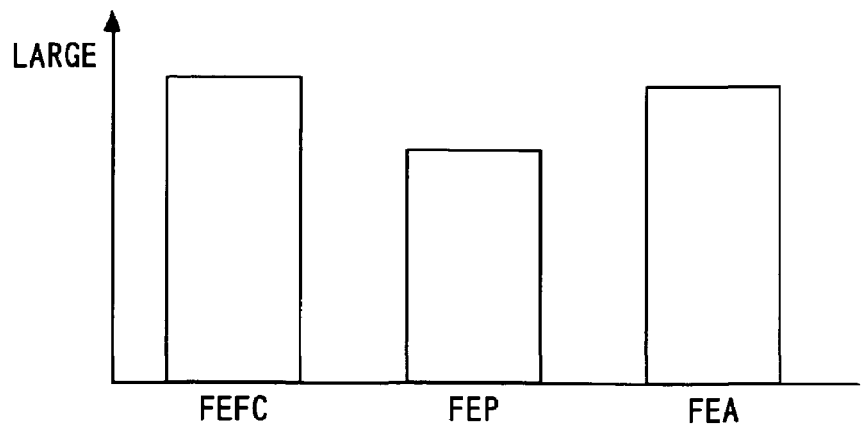
FIG. 21 is a view showing a fuel economy ratio obtained through control by the control system according to the present embodiment together with a fuel economy ratio obtained using the fuel economy map alone, and a fuel economy ratio obtained using the output map alone.

Further, FIG. 21 shows a fuel economy ratio FEA (mile/gallon) under the control of the control system 1 together with fuel economy ratios FEFC and FEP obtained using a fuel economy map alone and an output map alone, respectively. As shown in FIG. 21, the fuel economy ratio FEA under the control of the control system 1 is larger than the fuel economy ratio FEP obtained using the output map alone, and substantially as large as the fuel economy ratio FEFC obtained using the fuel economy map alone, so that it was confirmed that it is possible to obtain excellent fuel economy of the engine 3.

As described above, according to the present embodiment, the phase control input Ucain is calculated based on the output map value Cain_M_P when acceleration is demanded, and otherwise, the phase control input Ucain is calculated based on the fuel economy map value Cain_M_FC (steps 43, 43 and 44). This makes it possible to ensure excellent fuel economy of the engine 3 and enhance the responsiveness of the output of the engine 3 when acceleration is demanded. Further, the lift control input Uliftin is calculated based on the detected cam phase Cain (steps 51 and 52), so that it is possible to compensate for the response delay of the variable cam phase mechanism 70 by controlling the intake air amount QA via the variable valve lift mechanism 50. This makes it possible to more excellently obtain the above-described effects, i.e. the effects of ensuring excellent fuel economy and enhancing the responsiveness of the output of the engine 3 when acceleration is demanded.

Furthermore, the demanded acceleration G_cmd is calculated based on the difference between the drive wheel demanded torque Tq_tire_cmd and the traveling resistance RL, and hence it is possible to properly calculate the demanded acceleration G_cmd as a parameter indicative of the degree of acceleration demanded of the engine 3 (hereinafter referred to as "the demanded acceleration degree").

Further, the correction value RL_cor is calculated based on the difference between the drive wheel torque Tq_tire_act and the total reference traveling resistance ALL_RL, which is the sum of the reference traveling resistance RL_base and the reference acceleration resistance Acc_r (steps 29 and 30), and the reference traveling resistance RL_base is corrected by the calculated correction value RL_cor, whereby the traveling resistance RL is calculated (step 31). This makes it possible to accurately calculate the traveling resistance RL with reference to the reference traveling resistance RL_base. Further, as is apparent from the method of calculating the traveling resistance RL, it is possible to calculate the traveling resistance RL only by computations, without requiring values obtained by detecting the actual weight of the vehicle V and the gradient of a road surface. This makes it possible to dispense with sensors for detecting the above values, thereby making it possible to reduce the manufacturing costs of the control system 1.

Figure 22:
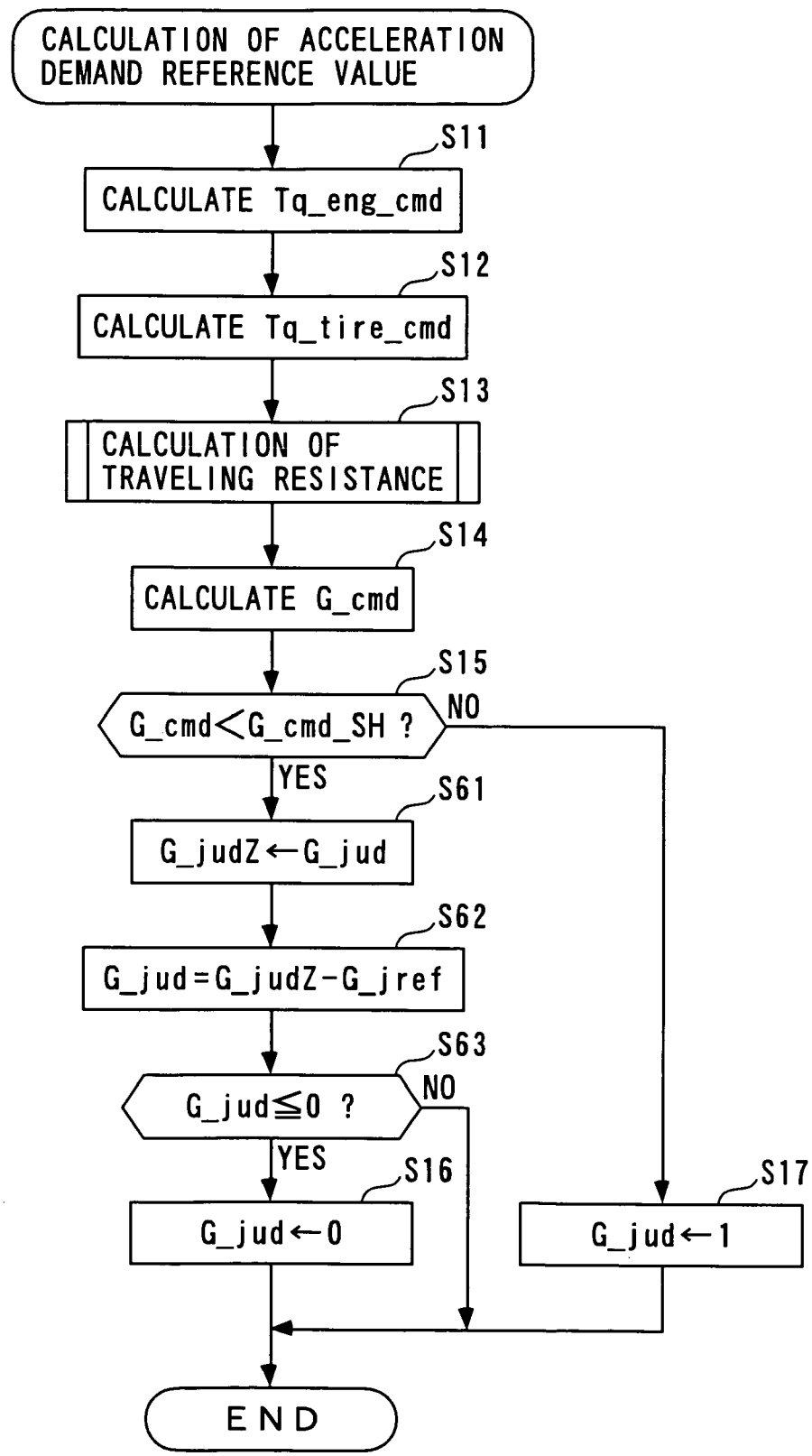
FIG. 22 is a flowchart of a variation of the process for calculating the acceleration demand reference value.

Next, a variation of the process for calculating the acceleration demand reference value will be described with reference to FIG. 22. The present process is distinguished from the aforementioned FIG. 13 process only in the method of calculating the acceleration demand reference value G_jud. In FIG. 22, steps identical to those of the process in FIG. 13 are designated by the same step numbers. Further, as is apparent from FIG. 22, steps 15 et seq. are different, and hence the steps 15 et seq. will be described hereinafter with reference to FIG. 22.

If the answer to the question of the step 15 is affirmative (YES) (G_cmd<G_cmd_SH), the acceleration demand reference value G_jud currently obtained is set to the immediately preceding value G_judZ of the acceleration demand reference value (step 61). Then, the current value G_jud of the same is calculated by subtracting a predetermined value G_jref (e.g. 0.01) from the immediately preceding value G_judZ set as above (step 62).

Next, it is determined whether or not the calculated acceleration demand reference value G_jud is not larger than 0 (step 63). If the answer to this question is negative (NO), the present process is immediately terminated, whereas if the answer to the question is affirmative (YES), it is judged that acceleration is not demanded, and the aforementioned step 16 is executed to set the acceleration demand reference value G_jud to 0, followed by terminating the present process.

Figure 23:
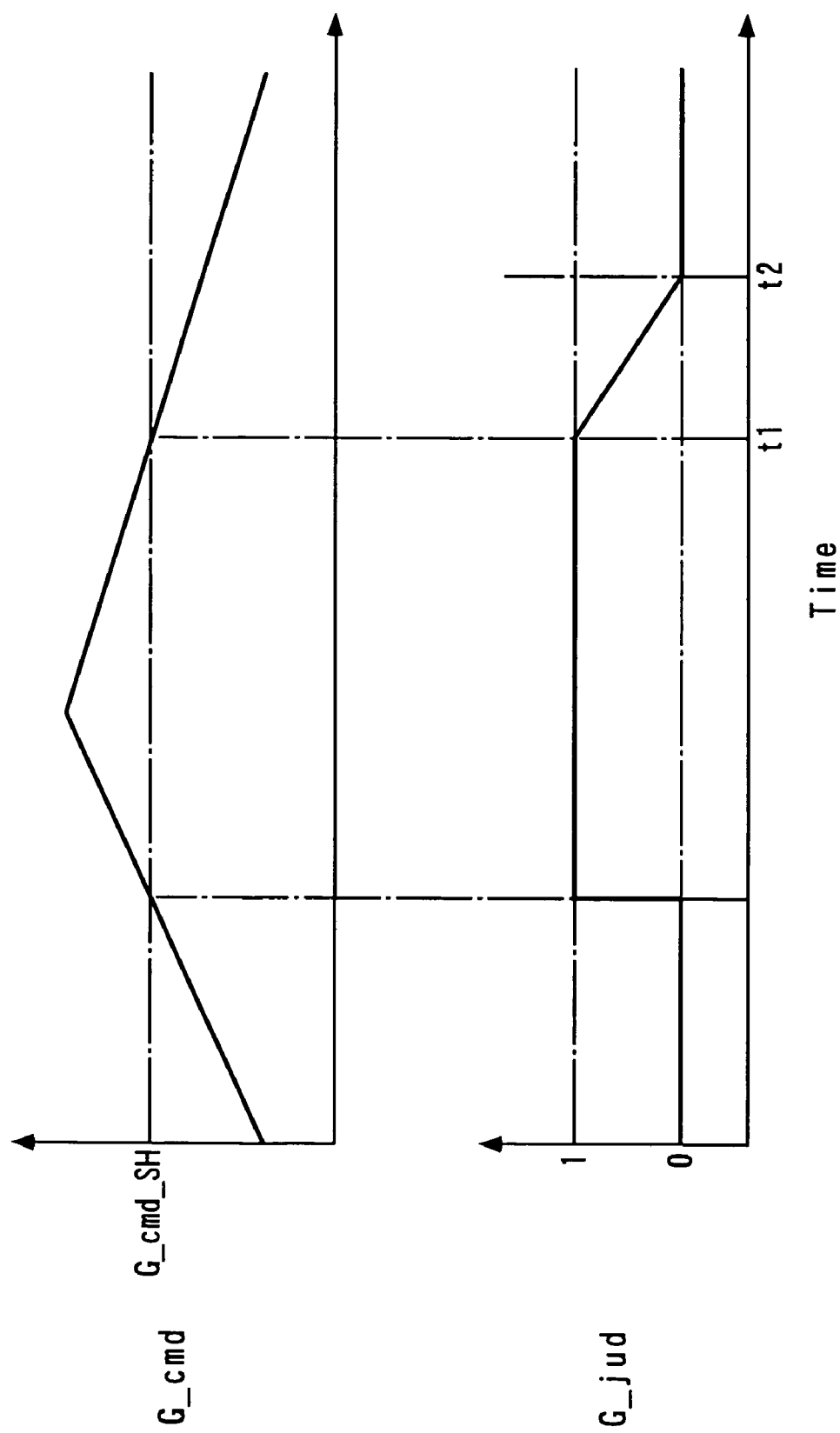
FIG. 23 is a view showing an example of changes in demanded acceleration and an acceleration demand reference value.

As described above, in the present process, as shown by time points t1 and t2 appearing in FIG. 23, even when the demanded acceleration G_cmd becomes lower than the threshold value G_cmd_SH, differently from the first embodiment described above, the acceleration demand reference value G_jud is not immediately set to 0 but is calculated such that it becomes equal to a value obtained by subtracting the predetermined value G_jref from 1 in each control timing of the present process (steps 61 and 62). Then, when a state in which the demanded acceleration G_cmd is lower than the threshold value G_cmd_SH continues to some extent until the value obtained by subtracting the predetermined value G_jref from the immediately preceding value G_judZ of the acceleration demand reference value becomes not larger than 0 (YES to step 63), the acceleration demand reference value G_jud is held at 0 insofar as G_cmd<G_cmd_SH holds (step 16) (after t2 et seq.).

The acceleration demand reference value G_jud is calculated as above for the following reason: As described hereinabove, the demanded acceleration G_cmd is calculated using the engine demanded output Bmep_cmd calculated based on the accelerator pedal opening AP. In contrast, in the vehicle equipped with the transmission 80 of the manual type as in the present embodiment, normally, the driver takes his foot off the accelerator pedal during a shift change, and hence the accelerator pedal opening AP becomes equal to 0. Therefore, when the shift change is executed while acceleration is demanded, the accelerator pedal opening AP becomes equal to 0, as described above, whereby the demanded acceleration G_cmd sometimes takes a negative value. In such a case, the acceleration demand reference value G_jud is not immediately set to 0 to thereby maintain the control of the cam phase Cain using the output map.

Further, a time period over which is maintained the control of the cam phase Cain using the output map is determined according to the magnitude of the predetermined value G_jref. Therefore, the predetermined value G_jref is set such that the time period required for maintaining the control of the cam phase Cain using the output map becomes slightly longer than a time period which it takes before the driver steps on the accelerator pedal after he temporarily takes his foot off the accelerator pedal for a shift change. This makes it possible to prevent the control of the cam phase Cain using the output map from being uselessly switched to the control of the cam phase Cain using the fuel economy map during a shift change, whereby it is possible to maintain the control of the cam phase Cain using the output map.

It should be noted that the lapse of time after the demanded acceleration G_cmd has become lower than the threshold value G_cmd_SH is measured by time measuring means, such as a timer, and when the lapse of time exceeds a predetermined time period, the acceleration demand reference value G_jud may be set to 0. In this case, by setting the predetermined time period to be slightly longer than the time period which it takes before the driver steps on the accelerator pedal after he temporarily takes his foot off the accelerator pedal for a shift change, it is possible to obtain the same advantageous effects as described hereinabove.

Next, a second embodiment of the present invention will be described. The present embodiment is distinguished from the first embodiment only in the process for calculating the acceleration demand reference value and the process for calculating the phase control input. More specifically, the present embodiment is distinguished from the first embodiment only in the method of calculating an acceleration demand reference value G_juda and the method of calculating the target cam phase Cain_cmd are different, and hereinafter, a description will be mainly given of points different from the first embodiment. In the present embodiment, the acceleration demand reference value G_juda corresponds to "weight dependent on the demanded acceleration degree parameter".

Figure 24:
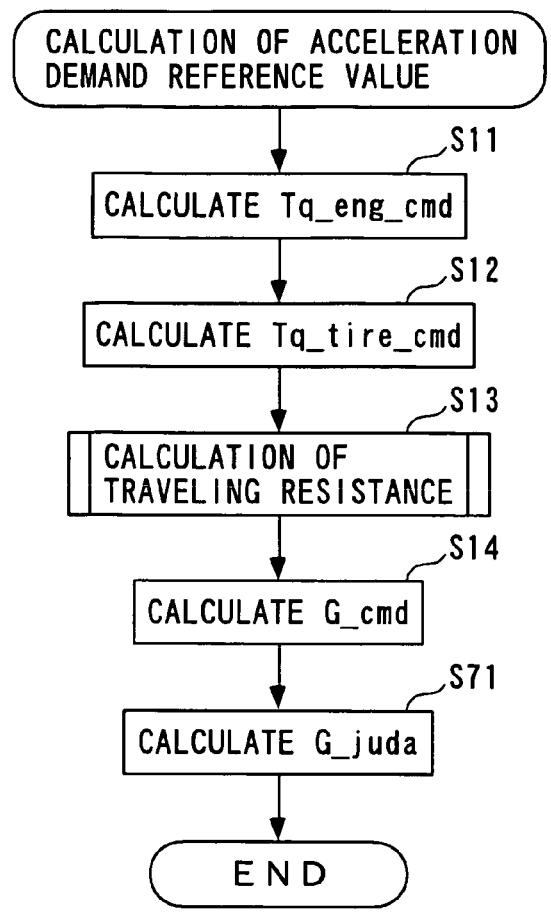
FIG. 24 is a flowchart of a process for calculating an acceleration demand reference value, according to a second embodiment of the present invention.
Figure 25:
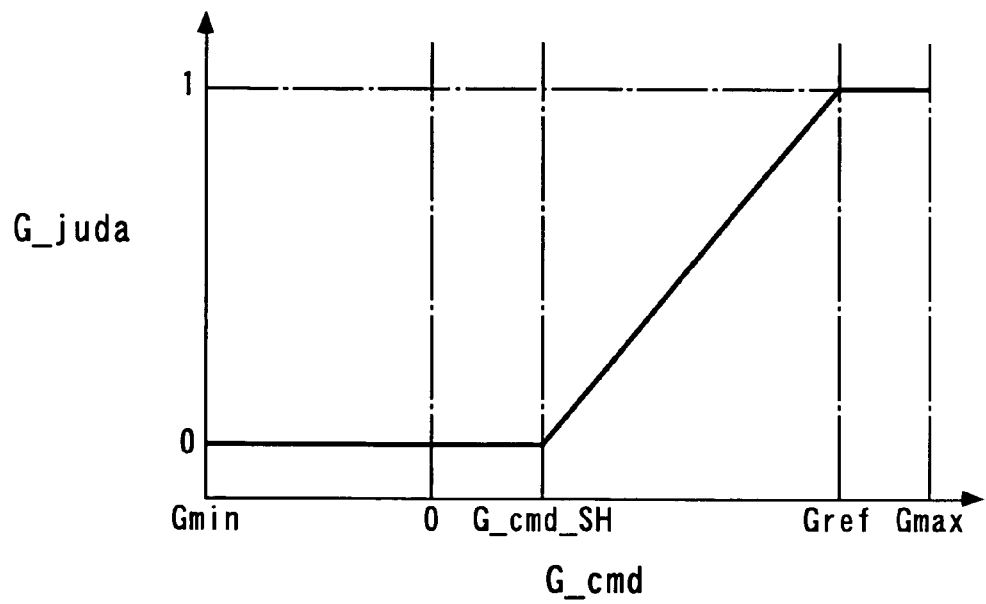
FIG. 25 is a view showing an example of a G_juda table which is used in the FIG. 24 process.

First, the process for calculating the acceleration demand reference value will be described with reference to FIG. 24. In a step following the step 14, the acceleration demand reference value G_juda is calculated by searching a G_juda table shown in FIG. 25 according to the demanded acceleration G_cmd, followed by terminating the present process. In FIG. 24, Gmin and Gmax represent the minimum value and the maximum value of the demanded acceleration G_cmd, respectively.

In the G_juda table, the acceleration demand reference value G_juda is set to 0 within a range where the demanded acceleration G_cmd is smaller than the threshold value G_cmd_SH, whereas within a range where the demanded acceleration G_cmd is larger than a predetermined value Gref (>G_cmd_SH), the acceleration demand reference value G_juda is set to 1. Further, within a range where G_cmd_SH≦G_cmd≦Gref holds, the acceleration demand reference value G_juda is linearly set to a larger value as the demanded acceleration G_cmd is larger. The predetermined value Gref is set to a value slightly smaller than the maximum value Gmax.

Figure 26:
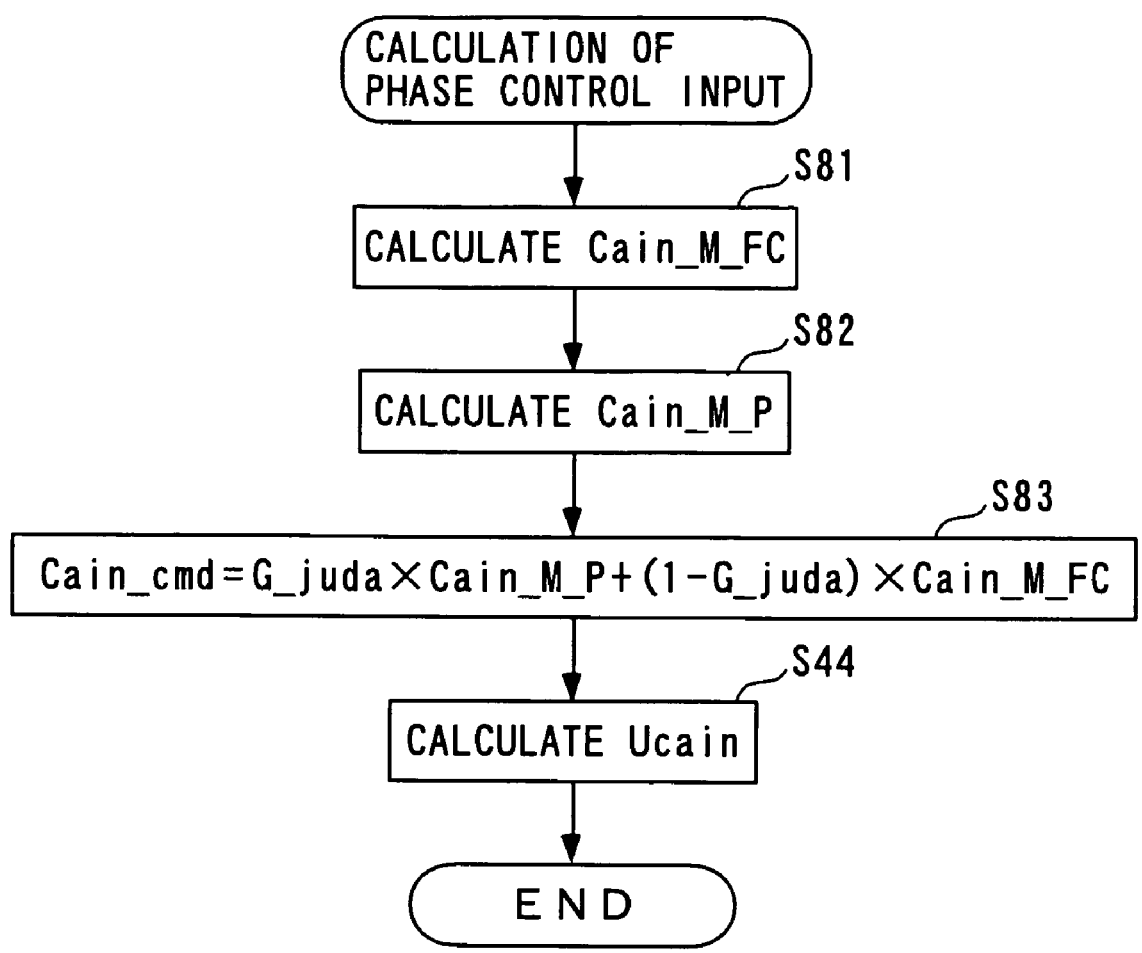
FIG. 26 is a flowchart of a process for calculating a phase control input, according to the second embodiment.

Next, the process for calculating the phase control input will be described with reference to FIG. 26. First, in a step 81, similarly to the aforementioned step 42, the fuel economy map value Cain_M_FC is calculated by searching the FIG. 16 fuel economy map described above according to the engine speed NE and the engine demanded output Bmep_cmd. Then, similarly to the aforementioned step 43, the output map value Cain_M_P is calculated by searching the FIG. 17 output map described above according to the engine speed NE and the engine demanded output Bmep_cmd (step 82).

Next, in a step 83, the target cam phase Cain_cmd is calculated using the acceleration demand reference value G_juda calculated in the aforementioned step 71, and the fuel economy map value Cain_N_FC and the output map value Cain_M_P calculated in the steps 81 and 82, respectively, by the following equation (10):

$$Cain\_cmd = G\_juda \times Cain\_M\_P + (1 - G\_juda) \times Cain\_M\_FC \quad (10)$$

Then, the aforementioned step 44 is executed, whereby the phase control input Ucain is calculated based on the calculated target cam phase Cain_cmd, followed by terminating the present process.

As is apparent from the equation (10), the target cam phase Cain_cmd for use in calculation of the phase control input Ucain is calculated by calculating the weighted average of the output map value Cain_N_P and the fuel economy map value Cain_N_FC, using the acceleration demand reference value G_juda as a weighting coefficient, with the output map value Cain_N_P being multiplied by the acceleration demand reference value G_juda, and the fuel economy map value Cain_N_FC being multiplied by (1−G_juda). Further, as is apparent from the settings of the above-described G_juda table, the acceleration demand reference value G_juda is calculated such that it becomes equal to 0 when the demanded acceleration G_cmd is smaller than the threshold value G_cmd_SH, whereas when the demanded acceleration G_cmd is not smaller than the threshold value G_cmd_SH, the acceleration demand reference value G_juda is linearly calculated such that it is a larger value within a range between 0 and 1 as the demanded acceleration G_cmd is larger.

As is apparent from the above description, when the demanded acceleration G_cmd is not smaller than the threshold value G_cmd_SH, the weight of the output map value Cain_M_P with respect to the target cam phase Cain_cmd becomes larger as the acceleration demand reference value G_juda is larger, i.e. as the demanded acceleration degree is larger. Therefore, when acceleration is demanded, the weight of the output map value Cain_M_P with respect to the target cam phase Cain_cmd becomes larger, so that it is possible to enhance the responsiveness of the output of the engine 3. Further, when G_cmd<G_cmd_SH holds, i.e. when acceleration is not demanded, the target cam phase Cain_cmd can be set to the fuel economy map value Cain_M_FC, whereby it is possible to obtain excellent fuel economy of the engine 3. From the above, similarly to the above-described first embodiment, it is possible to ensure excellent fuel economy to enhance the responsiveness of the output of the engine 3 when acceleration is demanded.

Further, as described above, as the demanded acceleration degree is larger, the weight of the output map value Cain_M_P with respect to the target cam phase Cain_cmd becomes larger, so that it is possible to obtain an appropriate target cam phase Cain_cmd that matches the magnitude of the degree of acceleration. This makes it possible to ensure excellent fuel economy and enhance the responsiveness of the output of the engine 3 when acceleration is demanded, in a well balanced manner.

It should be noted that although in the above-described G_juda table, a section for setting the acceleration demand reference value G_juda to a value between 0 and 1 is defined by the threshold value G_cmd_SH and the predetermined value Gref, this is not limitative, but the section may be defined by other desired values insofar as the values are larger than 0 and smaller than the maximum value Gmax.

It should be noted that the present invention is by no means limited to the embodiments described above, but it can be practiced in various forms. For example, although in the above-described embodiments, the present invention is applied to the engine 3 of a type in which the response speed of the variable valve lift mechanism 50 is higher than that of the variable cam phase mechanism 70, by way of example, this is not limitative, but inversely, the present invention can be applied to an internal combustion engine of a type in which the response speed of a variable cam phase mechanism is higher than that of a variable valve lift mechanism. Further, although in the above-described embodiments, the first and second variable valve-actuating mechanisms are formed by the variable valve lift mechanism 50 and the variable cam phase mechanism 70, respectively, this is not limitative, but the first and second variable valve-actuating mechanisms may be formed by other mechanisms insofar as they are capable of changing the intake air amount QA by changing the operating characteristics of the intake valves 4. Furthermore, although in the above-described embodiments, the present invention is applied to the engine 3 in which the valve lift Liftin and the valve timing of the intake valves 4 are changed by the variable valve lift mechanism 50 and the variable cam phase mechanism 70, respectively, by way of example, this is not limitative, but the present invention can be applied to an internal combustion engine of a type in which the same operating characteristics of the intake valves 4 are changed by two mechanisms with different response speeds.

Further, although in the above-described embodiments, the target cam phase Cain_cmd is determined by searching the fuel economy map or the output map, the target cam phase Cain_cmd may be calculated by computation without using the maps. Furthermore, although in the above-described embodiments, as a load parameter, the engine demanded output Bmep_cmd, which is calculated, is used, the accelerator pedal opening AP, which is detected, may be used. Further, although in the above-described embodiments, the drive wheel torque Tq_tire_act and the vehicle acceleration Acc are determined by computation, they may be determined by detection using sensors. Further, the demanded acceleration G_cmd may be calculated by another method in place of the method employed in the above-described embodiments. For example, the demanded acceleration G_cmd may be calculated based on the amount of change in the accelerator pedal opening AP. Further, the traveling resistance RL as well may be calculated by another method in place of the method according to the above-described embodiments. For example, the weight of the vehicle V and the gradients of road surfaces may be detected by sensors for calculating the traveling resistance RL based on the detected values.

Further, although in the above-described embodiments, the present invention is applied to the automotive engine 3 by way of example, this is not limitative, but it can be applied to various types of industrial internal combustion engines including engines for ship propulsion machines, such as an outboard motor having a vertically-disposed crankshaft.

It is further understood by those skilled in the art that the foregoing are preferred embodiments of the invention, and that various changes and modifications may be made without departing from the spirit and scope thereof.

What is claimed is:

1. A control system for an internal combustion engine that is configured to be capable of changing an intake air amount by changing operating characteristics of an intake valve, using a first variable valve-actuating mechanism, and a second variable valve-actuating mechanism having a lower response speed than a response speed of the first variable valve-actuating mechanism, comprising:
   operation amount-detecting means for detecting an amount of operation of the second variable valve-actuating mechanism with respect to the intake valve;
   first control input-calculating means for calculating a first control input for controlling the first variable valve-actuating mechanism based on the detected amount of operation of the second variable valve-actuating mechanism;
   load parameter-detecting means for detecting a load parameter indicative of load on the engine;
   demanded acceleration degree parameter-calculating means for calculating a demanded acceleration degree parameter indicative of a degree of acceleration demanded of the engine;
   output priority-type calculation means for calculating a second control input for controlling the second variable valve-actuating mechanism, based on the detected load parameter with priority to an output of the engine;
   fuel economy priority-type calculation means for calculating the second control input based on the load parameter with priority to fuel economy of the engine; and
   selection means for selecting one of said output priority-type calculation means and said fuel economy priority-type calculation means for calculating the second control input, according to the calculated demanded acceleration degree parameter.

2. A control system as claimed in claim 1, wherein the engine is installed on a vehicle as a drive source, and
   the control system further comprising:
   drive wheel demanded torque-calculating means for calculating a drive wheel demanded torque demanded of drive wheels of the vehicle; and
   traveling resistance-calculating means for calculating a traveling resistance of the vehicle,
   wherein said demanded acceleration degree parameter-calculating means calculates the demanded acceleration degree parameter based on the calculated drive wheel demanded torque and the calculated traveling resistance.

3. A control system as claimed in claim 2, further comprising:
   drive wheel torque-detecting means for detecting a torque of the drive wheels;
   vehicle speed-detecting means for detecting a speed of the vehicle; and
   acceleration-detecting means for detecting acceleration of the vehicle, and
   wherein said traveling resistance-calculating means comprises:
   reference traveling resistance-calculating means for calculating a traveling resistance to be obtained when the vehicle and a road surface on which the vehicle travels are in respective predetermined reference states, based on the detected vehicle speed, as a reference traveling resistance;
   reference acceleration resistance-calculating means for calculating an acceleration resistance to be obtained when the vehicle is in the predetermined reference state, based on the detected acceleration of the vehicle, as a reference acceleration resistance; and
   connection value-calculating means for calculating a correction value based on the detected torque of the drive wheels, the calculated reference traveling resistance, and the calculated reference acceleration resistance, and
   wherein the traveling resistance is calculated by correcting the reference traveling resistance using the calculated connection value.

4. A control system for an internal combustion engine that is configured to be capable of changing an intake air amount by changing operating characteristics of an intake valve, using a first variable valve-actuating mechanism, and a second variable valve-actuating mechanism having a lower response speed than a response speed of the first variable valve-actuating mechanism, comprising:
   operation amount-detecting means for detecting an amount of operation of the second variable valve-actuating mechanism with respect to the intake valve;
   first control input-calculating means for calculating a first control input for controlling the first variable valve-actuating mechanism based on the detected amount of operation of the second variable valve-actuating mechanism;
   load parameter-detecting means for detecting a load parameter indicative of load on the engine;
   demanded acceleration degree parameter-calculating means for calculating a demanded acceleration degree parameter indicative of a degree of acceleration demanded of the engine; output priority-type calculation means for calculating a second control input for controlling the second variable valve-actuating mechanism, based on the detected load parameter with priority to an output of the engine;
   fuel economy priority-type calculation means for calculating the second control input based on the load parameter with priority to fuel economy of the engine; and
   second control input-calculating means for calculating the second control input by calculating a weighted average of a value calculated by said output priority-type calculation means and a value calculated by said fuel economy priority-type calculation means, using a weight dependent on the calculated demanded acceleration degree parameter.

5. A control system as claimed in claim 4, wherein the engine is installed on a vehicle as a drive source, and
   the control system further comprising:
   drive wheel demanded torque-calculating means for calculating a drive wheel demanded torque demanded of drive wheels of the vehicle; and
   traveling resistance-calculating means for calculating a traveling resistance of the vehicle,
   wherein said demanded acceleration degree parameter-calculating means calculates the demanded acceleration degree parameter based on the calculated drive wheel demanded torque and the calculated traveling resistance.

6. A control system as claimed in claim 5, further comprising:
   drive wheel torque-detecting means for detecting a torque of the drive wheels;
   vehicle speed-detecting means for detecting a speed of the vehicle; and
   acceleration-detecting means for detecting acceleration of the vehicle, and wherein said traveling resistance-calculating means comprises:

reference traveling resistance-calculating means for calculating a traveling resistance to be obtained when the vehicle and a road surface on which the vehicle travels are in respective predetermined reference states, based on the detected vehicle speed, as a reference traveling resistance;

reference acceleration resistance-calculating means for calculating an acceleration resistance to be obtained when the vehicle is in the predetermined reference state, based on the detected acceleration of the vehicle, as a reference acceleration resistance; and correction value-calculating means for calculating a correction value based on the detected torque of the drive wheels, the calculated reference traveling resistance, and the calculated reference acceleration resistance, and wherein the traveling resistance is calculated by correcting the reference traveling resistance using the calculated correction value.

* * * * *